(12) United States Patent
Ishihara et al.

(10) Patent No.: US 11,146,080 B2
(45) Date of Patent: Oct. 12, 2021

(54) POWER SUPPLY DEVICE

(71) Applicant: Mitsubishi Electric Corporation, Chiyoda-ku (JP)

(72) Inventors: Hiroki Ishihara, Chiyoda-ku (JP); Toshihiro Wada, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 112 days.

(21) Appl. No.: 16/499,644

(22) PCT Filed: Feb. 5, 2018

(86) PCT No.: PCT/JP2018/003728
§ 371 (c)(1),
(2) Date: Sep. 30, 2019

(87) PCT Pub. No.: WO2018/220900
PCT Pub. Date: Dec. 6, 2018

(65) Prior Publication Data
US 2020/0091736 A1    Mar. 19, 2020

(30) Foreign Application Priority Data
Jun. 1, 2017   (JP) .............................. JP2017-108975

(51) Int. Cl.
*H02J 7/00* (2006.01)
*H01M 10/44* (2006.01)
(Continued)

(52) U.S. Cl.
CPC ............ *H02J 7/0021* (2013.01); *H01M 10/44* (2013.01); *H01M 10/48* (2013.01); *H02M 3/1582* (2013.01); *H02J 7/345* (2013.01)

(58) Field of Classification Search
CPC ........ H02J 7/0021; H02J 7/0019; H02J 7/345; H01M 10/44; H01M 10/48; H02M 3/1582;
(Continued)

(56) References Cited

U.S. PATENT DOCUMENTS

| 2015/0028817 A1* | 1/2015 | Brockerhoff | ............ B60L 58/19 320/137 |
| 2016/0276849 A1* | 9/2016 | Hamada | ................ H02J 7/0019 |

(Continued)

FOREIGN PATENT DOCUMENTS

| JP | 2003-274566 A | 9/2003 |
| JP | 2005-184876 A | 7/2005 |
| JP | 2008-109749 A | 5/2008 |

OTHER PUBLICATIONS

International Search Report dated Mar. 20, 2018 in PCT/JP2018/003728 filed Feb. 5, 2018.

*Primary Examiner* — Nha T Nguyen
(74) *Attorney, Agent, or Firm* — Xsensus LLP

(57) ABSTRACT

The positive electrode of the unit in an m-th configuration stage (m is an integer satisfying $2 \le m \le n$) is connected to a negative electrode of the unit in an (m−1)-th configuration stage. A drain-side terminal of the step-up switch included in the m-th configuration stage is connected to a source-side terminal of the step-up switch included in the (m−1)-th configuration stage. A source-side terminal of the step-up switch included in an n-th configuration stage is connected to a negative electrode of the unit included in the n-th configuration stage. The n step-up switches connected in series are connected in parallel to a series circuit including the power storage mechanism and the reactor.

18 Claims, 26 Drawing Sheets

(51) Int. Cl.
*H01M 10/48* (2006.01)
*H02M 3/158* (2006.01)
*H02J 7/34* (2006.01)

(58) Field of Classification Search
CPC .. H02M 1/0077; H02M 1/0074; H02M 3/158; Y02T 10/70; Y02E 60/10
See application file for complete search history.

(56) References Cited

U.S. PATENT DOCUMENTS

2017/0155321 A1* 6/2017 Kidera ................. H02M 3/158
2017/0346398 A1* 11/2017 Long ....................... H02M 1/14

* cited by examiner

FIG. 9

| OPERATION | CHARGE | | | DISCHARGE | | |
|---|---|---|---|---|---|---|
| UNIT | 201 202 203 | 202 203 | 203 | 201 202 203 | 202 203 | 203 |
| SWITCH 301 | ON⇔OFF | ON | ON | OFF | OFF | OFF |
| SWITCH 302 | ON | ON⇔OFF | ON | OFF | OFF | OFF |
| SWITCH 303 | ON | ON | ON⇔OFF | OFF | OFF | OFF |
| SWITCH 311 | OFF | OFF | OFF | ON⇔OFF | OFF | OFF |
| SWITCH 312 | OFF | OFF | OFF | OFF | ON⇔OFF | OFF |
| SWITCH 313 | OFF | OFF | OFF | OFF | OFF | ON⇔OFF |

FIG. 10

| UNIT | 201 | | 202 | | 203 | |
|---|---|---|---|---|---|---|
| VOLTAGE AS COMPARED TO AVERAGE VOLTAGE | GREAT | SMALL | GREAT | SMALL | GREAT | SMALL |
| FIRST STEP | CHARGE FROM POWER STORAGE MECHANISM TO 202 AND 203 | DISCHARGE FROM 202 AND 203 TO POWER STORAGE MECHANISM | DISCHARGE FROM 202 AND 203 TO POWER STORAGE MECHANISM | CHARGE FROM POWER STORAGE MECHANISM TO 202 AND 203 | DISCHARGE FROM 203 TO POWER STORAGE MECHANISM | CHARGE FROM POWER STORAGE MECHANISM TO 203 |
| SECOND STEP | — | — | CHARGE FROM POWER STORAGE MECHANISM TO 203 | DISCHARGE FROM 203 TO POWER STORAGE MECHANISM | — | — |

FIG. 13

| OPERATION | CHARGE | | | DISCHARGE | | |
|---|---|---|---|---|---|---|
| UNIT | 201 | 201 202 | 201 202 203 | 201 | 201 202 | 201 202 203 |
| SWITCH 301 | ON⇔OFF | ON | ON | OFF | OFF | OFF |
| SWITCH 302 | ON | ON⇔OFF | ON | OFF | OFF | OFF |
| SWITCH 303 | ON | ON | ON⇔OFF | OFF | OFF | OFF |
| SWITCH 311 | OFF | OFF | OFF | ON⇔OFF | OFF | OFF |
| SWITCH 312 | OFF | OFF | OFF | OFF | ON⇔OFF | OFF |
| SWITCH 313 | OFF | OFF | OFF | OFF | OFF | ON⇔OFF |

FIG. 14

| UNIT | 201 | | 202 | | 203 | |
|---|---|---|---|---|---|---|
| VOLTAGE AS COMPARED TO AVERAGE VOLTAGE | GREAT | SMALL | GREAT | SMALL | GREAT | SMALL |
| FIRST STEP | DISCHARGE FROM 201 TO POWER STORAGE MECHANISM | CHARGE FROM POWER STORAGE MECHANISM TO 201 | DISCHARGE FROM 201 AND 202 TO POWER STORAGE MECHANISM | CHARGE FROM POWER STORAGE MECHANISM TO 201 AND 202 | CHARGE FROM POWER STORAGE MECHANISM TO 201 AND 202 | DISCHARGE FROM 201 AND 202 TO POWER STORAGE MECHANISM |
| SECOND STEP | — | — | CHARGE FROM POWER STORAGE MECHANISM TO 201 | DISCHARGE FROM 201 TO POWER STORAGE MECHANISM | — | — |

FIG. 32

| UNIT | 201 | | 202 | | 203 | |
|---|---|---|---|---|---|---|
| VOLTAGE AS COMPARED TO AVERAGE VOLTAGE | GREAT | SMALL | GREAT | SMALL | GREAT | SMALL |
| OPERATION OF ELECTRIC DEVICE | POWER-RUNNING | REGENE-RATION | POWER-RUNNING | REGENE-RATION | POWER-RUNNING | REGENE-RATION | POWER-RUNNING | REGENE-RATION | POWER-RUNNING | REGENE-RATION | POWER-RUNNING | REGENE-RATION |
| CHARGE/DISCHARGE OPERATION | DISCHARGE FROM 201, 202, 203 | CHARGE TO 202, 203 | DISCHARGE FROM 202, 203 | CHARGE TO 201, 202, 203 | DISCHARGE FROM 201, 202, 203 | CHARGE TO 203 | DISCHARGE FROM 203 | CHARGE TO 201, 202, 203 | DISCHARGE FROM 201, 202, 203 | CHARGE TO 201, 202, 203 | DISCHARGE FROM 201, 202, 203 | CHARGE TO 203 |

FIG. 35

| UNIT | 201 | | 202 | | 203 | |
|---|---|---|---|---|---|---|
| VOLTAGE AS COMPARED TO AVERAGE VOLTAGE | GREAT | SMALL | GREAT | SMALL | GREAT | SMALL |
| OPERATION OF ELECTRIC DEVICE | POWER-RUNNING | REGENE-RATION | POWER-RUNNING | REGENE-RATION | POWER-RUNNING | REGENE-RATION | POWER-RUNNING | REGENE-RATION | POWER-RUNNING | REGENE-RATION | POWER-RUNNING | REGENE-RATION |
| CHARGE/DISCHARGE OPERATION | DISCHARGE FROM 201 | CHARGE TO 201, 202, 203 | DISCHARGE FROM 201, 202, 203 | CHARGE TO 201 | DISCHARGE FROM 201, 202, 203 | CHARGE TO 201 | DISCHARGE FROM 201 | CHARGE TO 201, 202, 203 | DISCHARGE FROM 201, 202, 203 | CHARGE TO 201, 202 | DISCHARGE FROM 201, 202 | CHARGE TO 201, 202, 203 |

POWER SUPPLY DEVICE

TECHNICAL FIELD

The present invention relates to a power supply device including a plurality of power storage devices connected in series.

BACKGROUND ART

In fields such as electric vehicles, hybrid electric vehicles, and home electric appliances, a power supply device including a module configuration in which a plurality of secondary cells are connected in series is widely known. Connecting a plurality of secondary cells in series enables increase in voltage of the module, thereby increasing power for charging or discharging.

However, when the module is charged or discharged, current flows uniformly therein, and therefore, if there are variations in voltages of units constituting the module, it is necessary to perform charging or discharging so that the secondary cell having the greatest or smallest voltage does not exceed the upper limit voltage or the lower limit voltage. That is, even if the other secondary cells have some margins for charging or discharging, it is impossible to input or output power any more.

Accordingly, in Patent Document 1, secondary cell voltages are equalized using a converter capable of actively inputting and outputting power to and from the secondary cells, and a circuit for selecting a secondary cell to or from which power is to be inputted or outputted. In this configuration, the number of passive components such as a coil, a capacitor, and a transformer is not proportional to the number of the secondary cells, and therefore a comparatively small-sized configuration is achieved. In addition, since it is possible to perform charging/discharging of each secondary cell selectively, the voltages can be equalized in a short time.

CITATION LIST

Patent Document

Patent Document 1: Japanese Laid-Open Patent Publication No. 2003-274566

SUMMARY OF THE INVENTION

Problems to be Solved by the Invention

However, in the invention of Patent Document 1, the circuit for selecting the secondary cells needs to be provided with a switch such as a relay that ensures complete isolation during a non-conductive state. Such a bidirectional switch capable of making isolation in two directions, i.e., forward direction and reverse direction, has a large size, leading to a problem of increasing the size of the circuit. Even if a comparatively small-sized switch such as a MOSFET is used instead, isolation can be made in only one direction because of the property of the accompanying body diode. Therefore, in order to obtain an isolation effect as in a bidirectional switch, components the number of which is twice as large as the number of components in the case of using a bidirectional switch are required, thus causing problems such as complication of the circuit and size increase of the circuit.

As described above, in the conventional device, a mechanism for power conversion needed when power is actively passed and received between a power storage device and a power storage mechanism, and a mechanism for selecting a power storage device to actively pass or receive power, are provided separately, and therefore the conventional device has a large number of switch components and thus is far from simplification, downsizing, and weight reduction of the circuit.

The present invention has been made to solve the above problem, and an object of the present invention is to provide a power supply device that has a small size and has a decreased number of switches so as to prevent complication and size increase of a circuit, and that enables equalization among voltages of units.

Solution to the Problems

A power supply device according to the present invention includes: n configuration stages, n being an integer equal to or greater than 2, each configuration stage including a unit including one or more power storage devices, a step-down switch having a drain-side terminal connected to a positive electrode of the unit, and a step-up switch having a drain-side terminal connected to a source-side terminal of the step-down switch; a power storage mechanism configured to store electric energy and capable of receiving and outputting power; a reactor connected in series to the power storage mechanism; and a control operation section configured to switch each of the step-down switch and the step-up switch between a conductive state and a non-conductive state, wherein the positive electrode of the unit in an m-th configuration stage of the configuration stages is connected to a negative electrode of the unit in an (m−1)-th configuration stage of the configuration stages, m being an integer satisfying $2 \leq m \leq n$, the drain-side terminal of the step-up switch included in the m-th configuration stage is connected to a source-side terminal of the step-up switch included in the (m−1)-th configuration stage, a source-side terminal of the step-up switch included in an n-th configuration stage of the configuration stages is connected to a negative electrode of the unit included in the n-th configuration stage, and the n step-up switches connected in series are connected in parallel to a series circuit including the power storage mechanism and the reactor.

Another power supply device according to the present invention includes: n configuration stages, n being an integer equal to or greater than 2, each configuration stage including a unit including one or more power storage devices, a step-down switch having a source-side terminal connected to a negative electrode of the unit, and a step-up switch having a source-side terminal connected to a drain-side terminal of the step-down switch; a power storage mechanism configured to store electric energy and capable of receiving and outputting power; a reactor connected in series to the power storage mechanism; and a control operation section configured to switch each of the step-down switch and the step-up switch between a conductive state and a non-conductive state, wherein a positive electrode of the unit in an m-th configuration stage of the configuration stages is connected to the negative electrode of the unit in an (m−1)-th configuration stage of the configuration stages, m being an integer satisfying $2 \leq m \leq n$, a drain-side terminal of the step-up switch included in the m-th configuration stage is connected to the source-side terminal of the step-up switch included in the (m−1)-th configuration stage, a drain-side terminal of the step-up switch included in a first configuration stage of the configuration stages is connected to a positive electrode of the unit included in the first configuration stage, and the n step-up switches connected in series are connected in parallel to a series circuit including the power storage mechanism and the reactor.

Effect of the Invention

The power supply device according to the present invention is provided with a plurality of units each including one or more power storage devices, and is capable of an operation of transferring power from one or more of the plurality of units to the power storage mechanism, and an operation of transferring power from the power storage mechanism to one or more of the units. In addition, the power supply device according to the present invention can equalize voltages of the units through charging/discharging operation while appropriately selecting the unit for passing or receiving power to or from the power storage mechanism.

The power conversion circuit included in the power supply device has both of a function of actively causing power to be passed and received between the power storage mechanism and one or more of the plurality of units, and a function of selecting the unit for passing or receiving power. Thus, the number of switches needed for the circuit is reduced, whereby complication of the circuit is prevented and the circuit is downsized.

BRIEF DESCRIPTION OF THE DRAWINGS

FIG. 9 shows the relationship between units to be charged/discharged and the ON/OFF states of the switches, in the power supply device according to embodiment 1 of the present invention.

FIG. 10 shows a procedure performed when a difference from the average voltage among the units is greater than a reference value, in the power supply device according to embodiment 1 of the present invention.

FIG. 13 shows the relationship between units to be charged/discharged and the ON/OFF states of the switches, in the other configuration of the power supply device according to embodiment 1 of the present invention.

FIG. 14 shows a procedure performed when a difference from the average voltage among the units is greater than a reference value, in the other configuration of the power supply device according to embodiment 1 of the present invention.

FIG. 32 shows operation patterns according to embodiment 7 of the present invention.

FIG. 35 shows operation patterns in the other configuration of the power supply device according to embodiment 7 of the present invention.

DESCRIPTION OF EMBODIMENTS

Embodiment 1

Hereinafter, a power supply device according to embodiment 1 of the present invention will be described with reference to FIG. 1 to FIG. 14.

Figure 1:
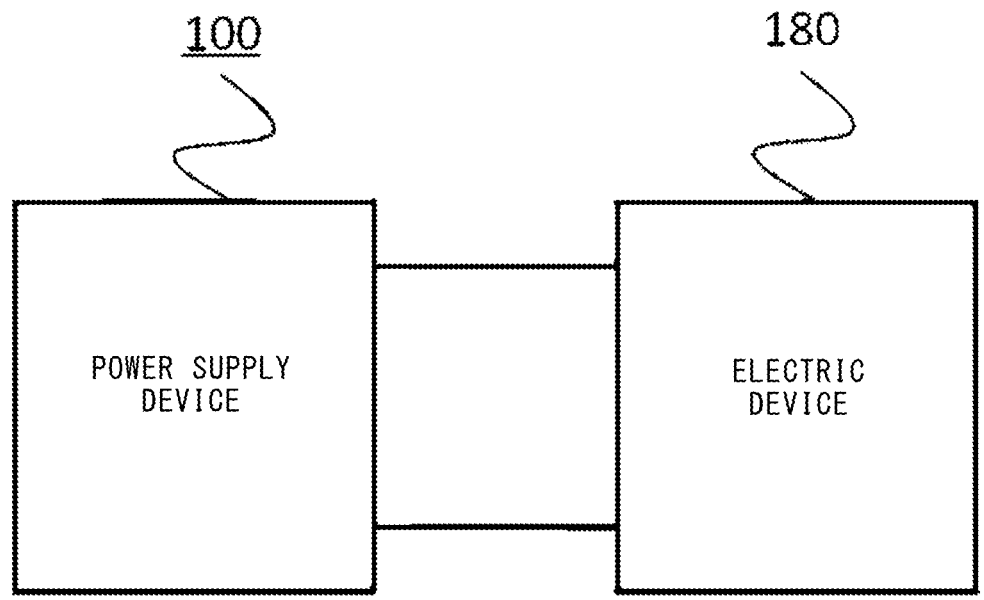
FIG. 1 is a diagram showing the configuration of a power supply device and an electric device in the present invention.

FIG. 1 is a diagram showing the configuration of the power supply device and an electric device according to embodiment 1 of the present invention. Preferably, a power supply device 100 is connected to an electric device 180, as shown in FIG. 1. The electric device 180 has at least one of a power consuming function and a power generating function. In the case where the electric device 180 exerts the power consuming function, power is transmitted thereto from the power supply device 100, and in the case where the electric device 180 exerts the power generating function, power is transmitted therefrom to the power supply device 100. It is noted that a plurality of power supply devices 100 may be connected to the electric device 180.

Figure 2:
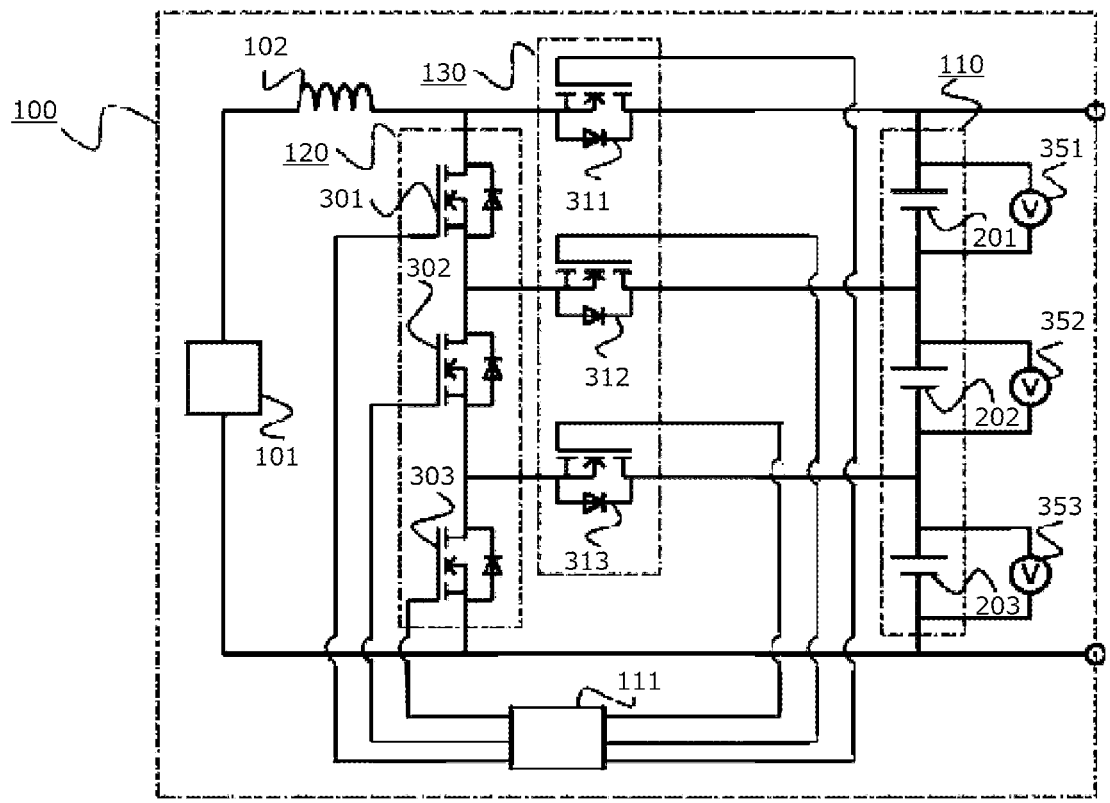
FIG. 2 is a diagram showing the configuration of the power supply device according to embodiment 1 of the present invention.

As shown in FIG. 2, the power supply device 100 in embodiment 1 includes a power storage mechanism 101, a reactor 102, a module 110, a first switch group 120 including switches 301, 302, 303, a second switch group 130 including switches 311, 312, 313, voltage measurement devices 351, 352, 353, and a control operation section 111.

It is noted that the switches 301 to 303 of the first switch group 120 are used as step-up switches for charging from the power storage mechanism 101 to the module 110, and the switch 311 to 313 of the second switch group 130 are used as step-down switches for discharging from the module 110 to the power storage mechanism 101.

The module 110 includes a plurality of units 201, 202, 203. It is noted that each unit may be a single power storage device or may be formed by a combination of a plurality of power storage devices. In addition, the power storage device may be a secondary cell or may be a device having a power storage function, such as a capacitor or an electric double layer capacitor. Preferably, the switches 301, 302, 303, 311, 312, 313 are MOSFETs. The switches 301 to 303, 311 to 313 may have body diodes therein, or may be formed by combining a diode with a switching element not having a body diode.

In FIG. 2 showing the configuration of the power supply device according to embodiment 1, the switches 301, 302, 303, 311, 312, 313 are set such that the input sides in the diode forward direction are source-side terminals, the output sides are drain-side terminals, and terminals to which signals are inputted to switch between a conductive state and a non-conductive state of the switch are gate terminals. The drain-side terminal of the switch 301 and the source-side terminal of the switch 311 are connected to each other, the drain-side terminal of the switch 311 is connected to the positive electrode of the unit 201, and the voltage measurement device 351 is connected in parallel to the unit 201. This forms a configuration stage for one unit.

That is, the configuration stage including the unit 201, the switches 301, 311, and the voltage measurement device 351 is defined as a first stage. A second configuration stage includes the unit 202, the switches 302, 312, and the voltage measurement device 352, and as in the first stage, the drain-side terminal of the switch 302 and the source-side terminal of the switch 312 are connected to each other, the drain-side terminal of the switch 312 is connected to the positive electrode of the unit 202, and the voltage measurement device 352 is connected in parallel to the unit 202. The negative electrode of the unit 201 and the positive electrode of the unit 202 are connected in series, and the source-side terminal of the switch 301 and the drain-side terminal of the switch 302 are connected to each other.

Similarly, a third configuration stage includes the unit 203, the switches 303, 313, and the voltage measurement device 353. The drain-side terminal of the switch 303 and the source-side terminal of the switch 313 are connected to each other, the drain-side terminal of the switch 313 is connected to the positive electrode of the unit 203, and the voltage measurement device 353 is connected in parallel to the unit 203. The negative electrode of the unit 202 and the positive electrode of the unit 203 are connected in series, and the source-side terminal of the switch 302 and the drain-side terminal of the switch 303 are connected to each other. The negative electrode of the unit 203 and the source-side terminal of the switch 303 are connected to each other, and a unit including the power storage mechanism 101 and the reactor 102 connected in series is connected in parallel to the switches 301 to 303 connected in series. That is, the drain-side terminal of the switch 301 is connected to one end of the reactor 102, and the source-side terminal of the switch 303 is connected to one end of the power storage mechanism 101.

The units 201, 202, 203 are connected in series, and both terminals of the positive electrode of the unit 201 and the negative electrode of the unit 203 are connected to the electric device 180. Information about voltages detected by the voltage measurement devices 351, 352, 353 is sent to the control operation section 111, and the control operation section 111 outputs signals to the gate-side terminals of the switches 301, 311, 302, 312, 303, 313, to switch each switch between a conductive state and a non-conductive state.

It is noted that the number of the units may be other than three, and also, the number of the configuration stages may be other than three. Preferably, the power storage mechanism 101 is a capacitor or a secondary cell.

Figure 3:
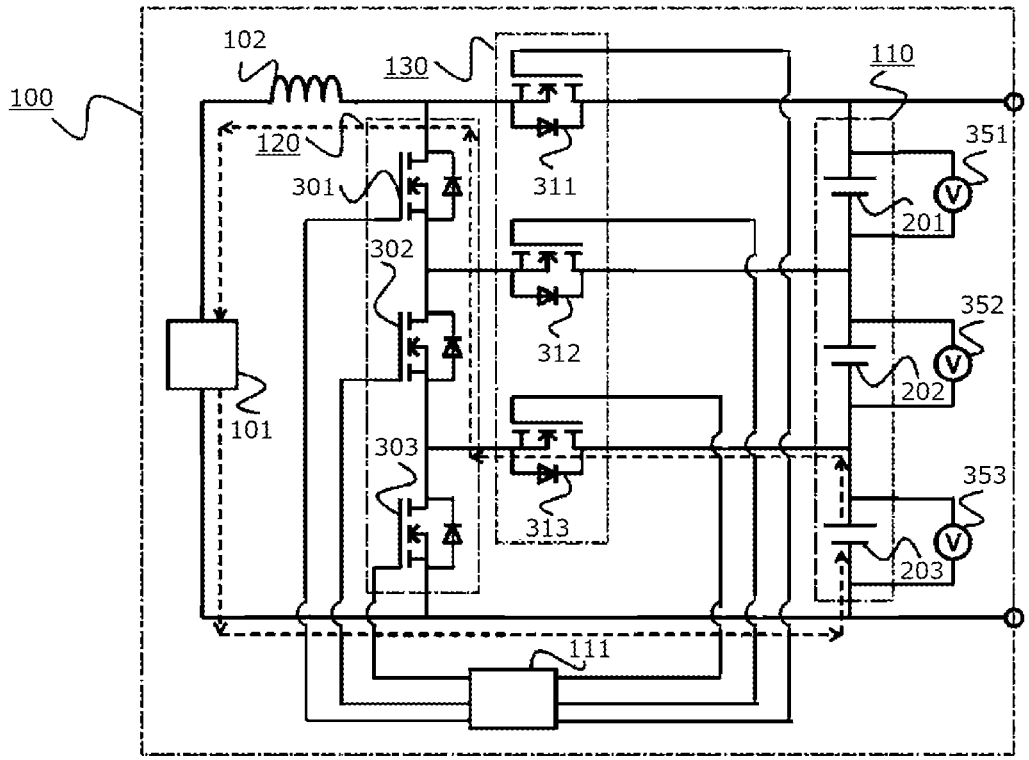
FIG. 3 is a diagram showing the direction of current when a switch 313 is in a conductive state, in the power supply device according to embodiment 1 of the present invention.

Next, with reference to FIG. 3, the case of discharging from the unit 203 to the power storage mechanism 101 will be described. In the case of discharging from the unit 203 to the power storage mechanism 101, the switches 301 to 303, 311, 312 are all brought into a non-conductive state. Thus, the units 201, 202 are electrically isolated from the power storage mechanism 101, and do not pass or receive power to or from the power storage mechanism 101. Meanwhile, the switch 313 is switched between a conductive state and a non-conductive state. When the switch 313 is in a conductive state, as shown by broken line arrows, power is transferred from the unit 203 through the switch 313, the diode parts of the switch 302 and the switch 301, and the reactor 102 to the power storage mechanism 101, whereby the unit 203 is discharged. When the switch 313 is in a non-conductive state, the unit 203 is electrically isolated, so that the unit 203 does not transfer power to the power storage mechanism 101. Through repetitive switching of the switch 313 between a conductive state and a non-conductive state, the unit 203 is gradually discharged, so that the voltage of the unit 203 is reduced.

Figure 4:
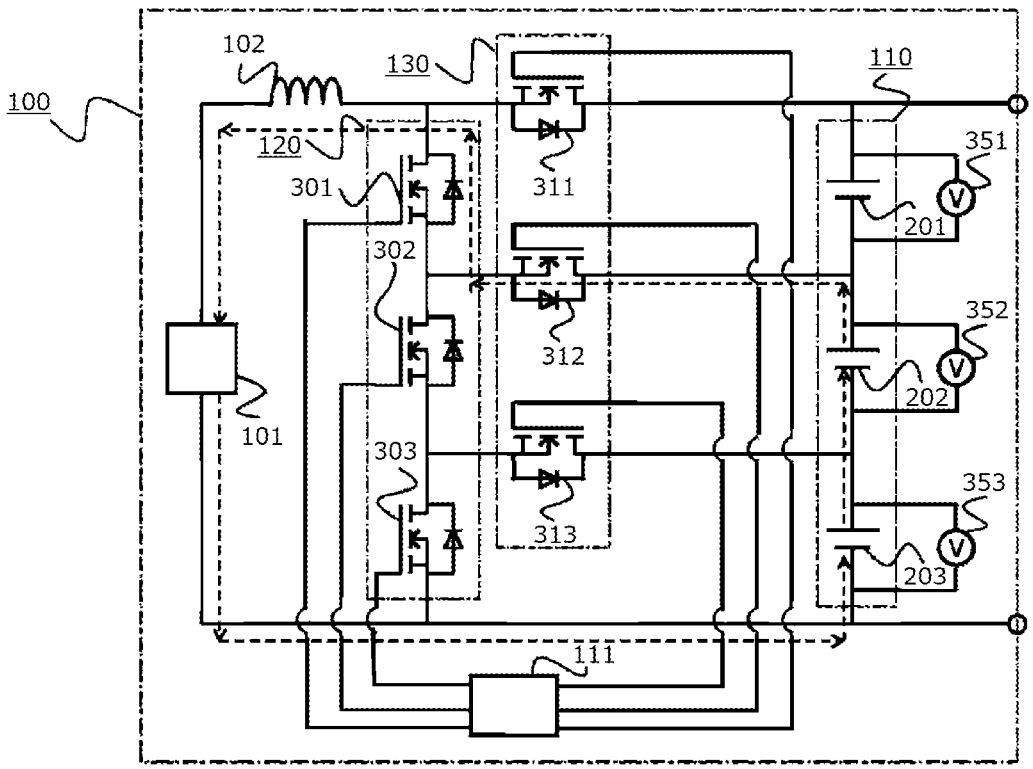
FIG. 4 is a diagram showing the direction of current when a switch 312 is in a conductive state, in the power supply device according to embodiment 1 of the present invention.

Next, with reference to FIG. 4, the case of discharging from the units 202, 203 to the power storage mechanism 101 will be described. In the case of discharging from the units 202, 203 to the power storage mechanism 101, the switches 301 to 303, 311, 313 are all brought into a non-conductive state. Thus, the unit 201 is electrically isolated from the power storage mechanism 101, and does not pass or receive power to or from the power storage mechanism 101. Meanwhile, the switch 312 is switched between a conductive state and a non-conductive state. When the switch 312 is in a conductive state, as shown by broken line arrows, power is transferred from the units 202, 203 through the switch 312, the diode part of the switch 301, and the reactor 102 to the power storage mechanism 101, whereby the units 202, 203 are discharged. When the switch 312 is in a non-conductive state, the units 202, 203 do not transfer power to the power storage mechanism 101. Through repetitive switching of the switch 312 between a conductive state and a non-conductive state, the units 202, 203 are gradually discharged, so that the voltages of the units 202, 203 are reduced.

Figure 5:
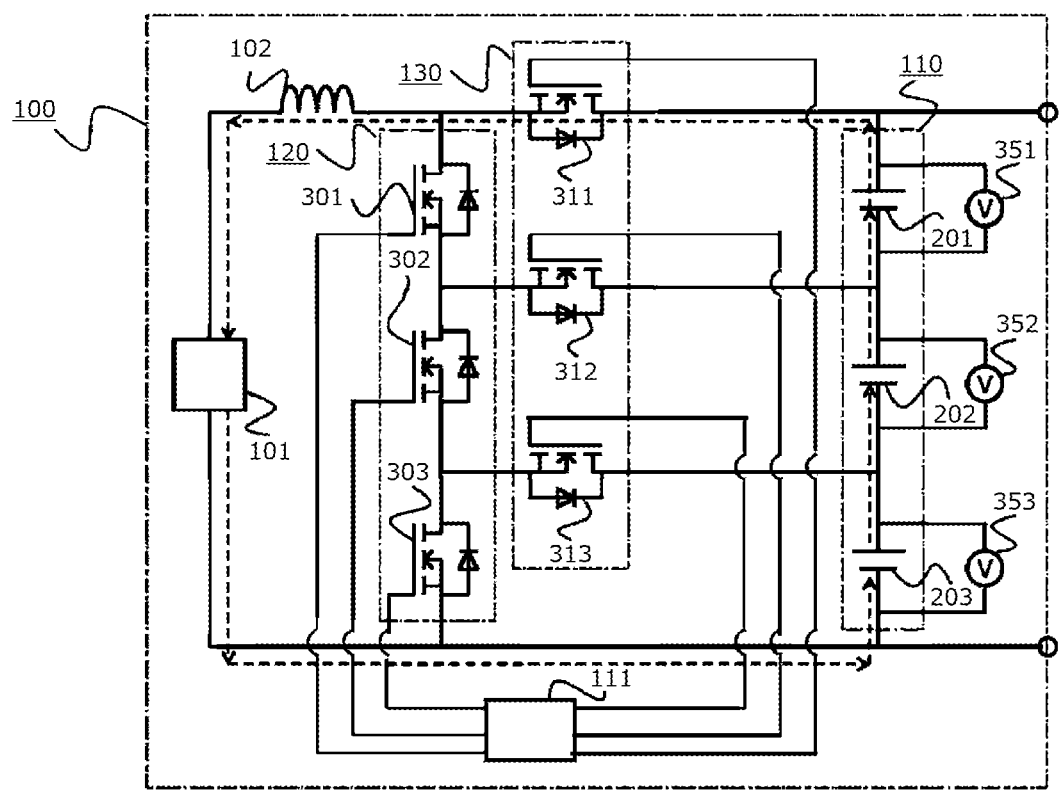
FIG. 5 is a diagram showing the direction of current when a switch 311 is in a conductive state, in the power supply device according to embodiment 1 of the present invention.

Next, with reference to FIG. 5, the case of discharging from the units 201, 202, 203 to the power storage mechanism 101 will be described. In the case of discharging from the units 201, 202, 203 to the power storage mechanism 101, the switches 301 to 303, 312, 313 are all brought into a non-conductive state. Meanwhile, the switch 311 is switched between a conductive state and a non-conductive state. When the switch 311 is in a conductive state, as shown by broken line arrows, power is transferred from the units 201, 202, 203 through the switch 311 and the reactor 102 to the power storage mechanism 101, whereby the units 201, 202, 203 are discharged. When the switch 311 is in a non-conductive state, the units 201, 202, 203 do not transfer power to the power storage mechanism 101. Through repetitive switching of the switch 311 between a conductive state and a non-conductive state, the units 201, 202, 203 are gradually discharged, so that the voltages of the units 201, 202, 203 are reduced.

Next, with reference to FIG. 6A and 6B, the case of charging from the power storage mechanism 101 to the unit 203 will be described. In the case of charging from the power storage mechanism 101 to the unit 203, the switches 301, 302 are brought into a conductive state, and the switches 311, 312, 313 are brought into a non-conductive state. Thus, the units 201, 202 are electrically isolated from the power storage mechanism 101, and do not pass or receive power to or from the power storage mechanism 101. Meanwhile, the switch 303 is switched between a conductive state and a non-conductive state.

Figure 6A:
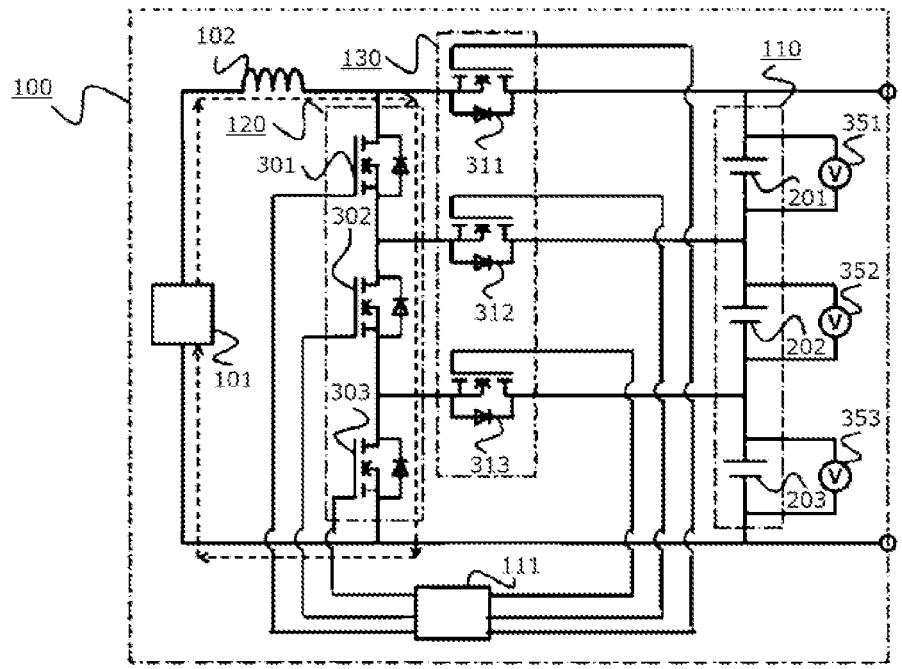
FIG. 6A and 6B are diagrams showing the direction of current when a switch 303 is in a conductive state and the direction of current when the switch 303 is in a non-conductive state, in the power supply device according to embodiment 1 of the present invention.
Figure 6B:
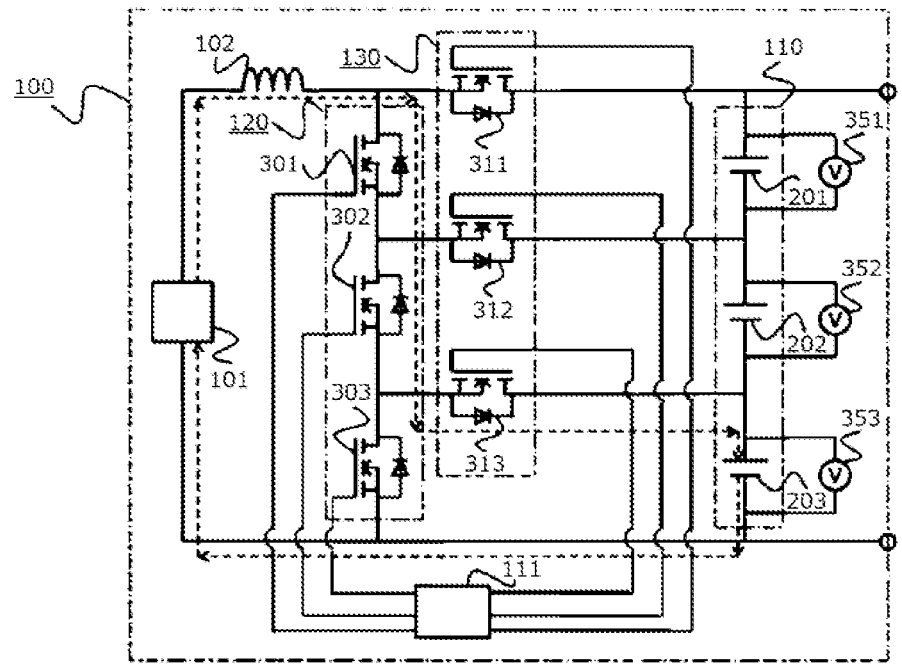

In FIG. 6A, the direction in which current flows when the switch 303 is in a conductive state is shown by broken line arrows. Current flows from the power storage mechanism 101 through the reactor 102, and the longer the conduction period of the switch 303 is, the more the current is amplified. In FIG. 6B, the direction in which current flows when the switch 303 is in a non-conductive state is shown by broken line arrows. The amplified current passes through the diode part of the switch 313, to flow to the unit 203. Through repetitive switching of the switch 303 between a conductive state and a non-conductive state, the unit 203 is charged, so that the voltage of the unit 203 is increased.

Next, with reference to FIG. 7A and 7B, the case of charging from the power storage mechanism 101 to the units 202, 203 will be described. In the case of charging from the power storage mechanism 101 to the units 202, 203, the switches 301, 303 are brought into a conductive state, and the switches 311, 312, 313 are brought into a non-conductive state. Thus, the unit 201 is electrically isolated from the power storage mechanism 101, and does not pass or receive power to or from the power storage mechanism 101. Meanwhile, the switch 302 is switched between a conductive state and a non-conductive state.

Figure 7A:
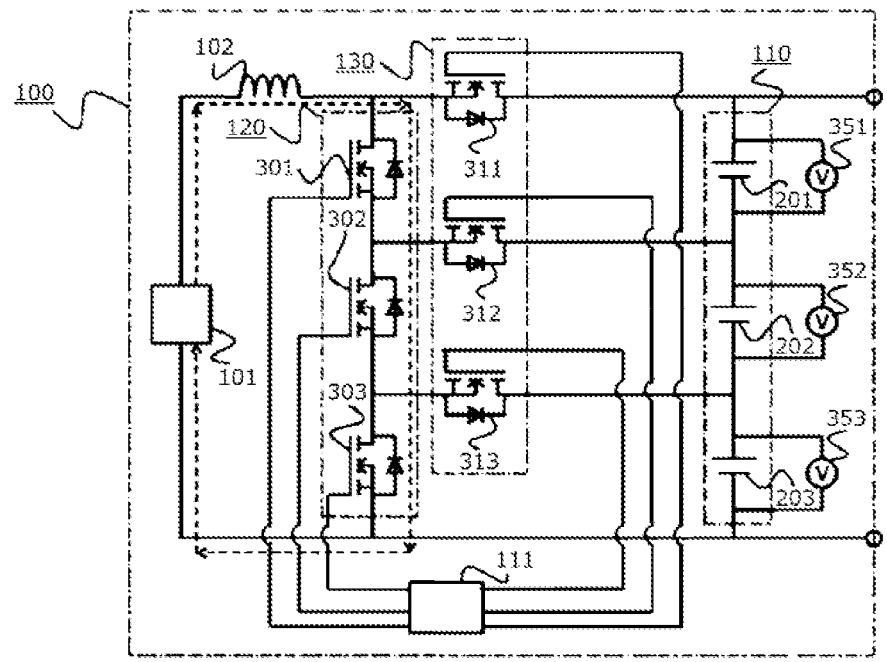
FIG. 7A and 7B are diagrams m showing the direction of current when a switch 302 is in a conductive state and the direction of current when the switch 302 is in a non-conductive state, in the power supply device according to embodiment 1 of the present invention.
Figure 7B:
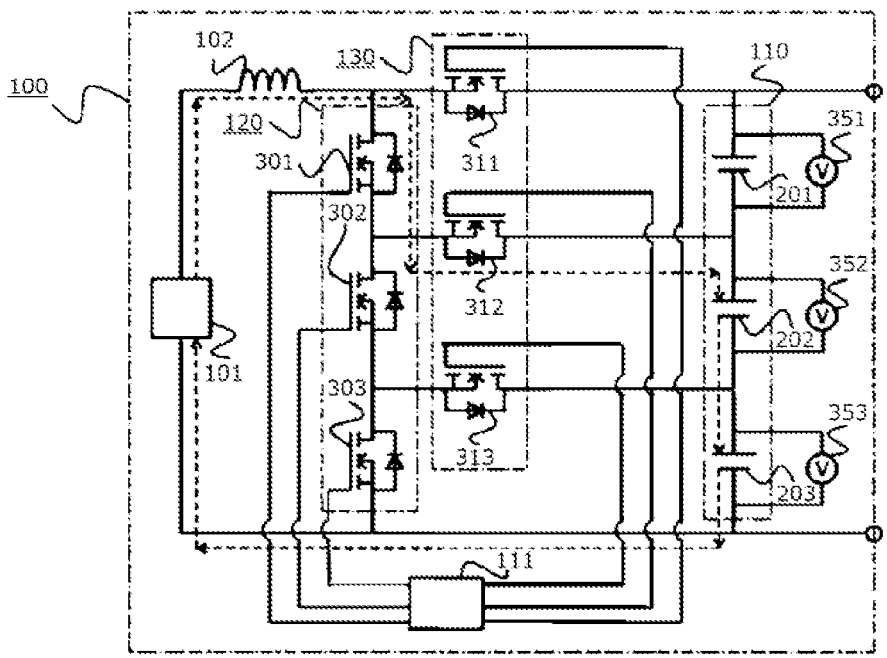

In FIG. 7A, the direction in which current flows when the switch 302 is in a conductive state is shown by broken line arrows. Current flows from the power storage mechanism 101 through the reactor 102, and the longer the conduction period of the switch 302 is, the more the current is amplified. In FIG. 7B, the direction in which current flows when the switch 302 is in a non-conductive state is shown by broken line arrows. The amplified current passes through the diode part of the switch 312, to flow to the units 202, 203. Through repetitive switching of the switch 302 between a conductive state and a non-conductive state, the units 202, 203 are charged, so that the voltages of the units 202, 203 are increased.

Next, with reference to FIG. 8A and 8B, the case of charging from the power storage mechanism 101 to the units 201, 202, 203 will be described. In the case of charging from the power storage mechanism 101 to the units 201, 202, 203, the switches 302, 303 are brought into a conductive state, and the switches 311, 312, 313 are brought into a non-conductive state. Meanwhile, the switch 301 is switched between a conductive state and a non-conductive state.

Figure 8A:
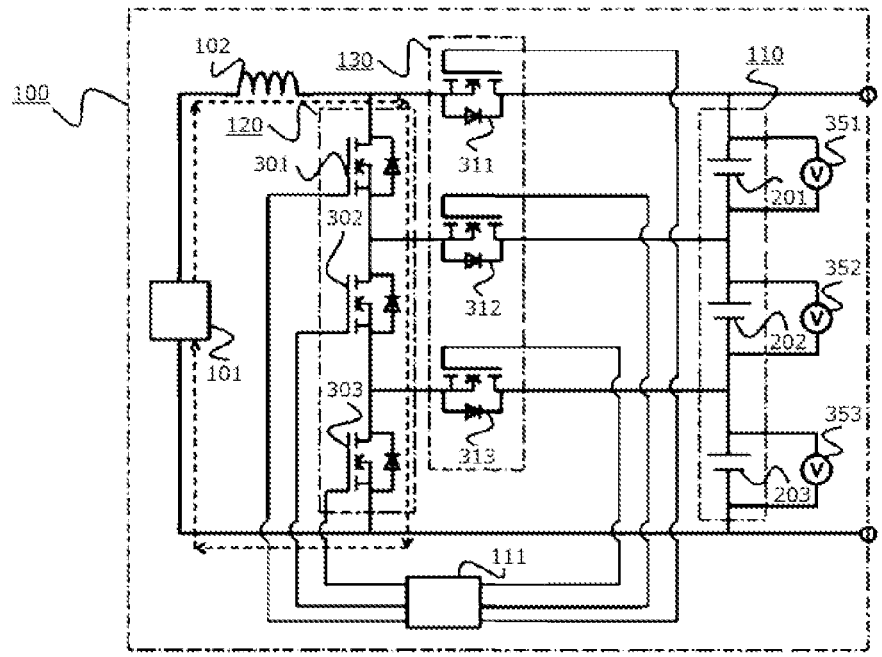
FIG. 8A and 8B are diagrams showing the direction of current when a switch 301 is in a conductive state and the direction of current when the switch 301 is in a non-conductive state, in the power supply device according to embodiment 1 of the present invention.
Figure 8B:
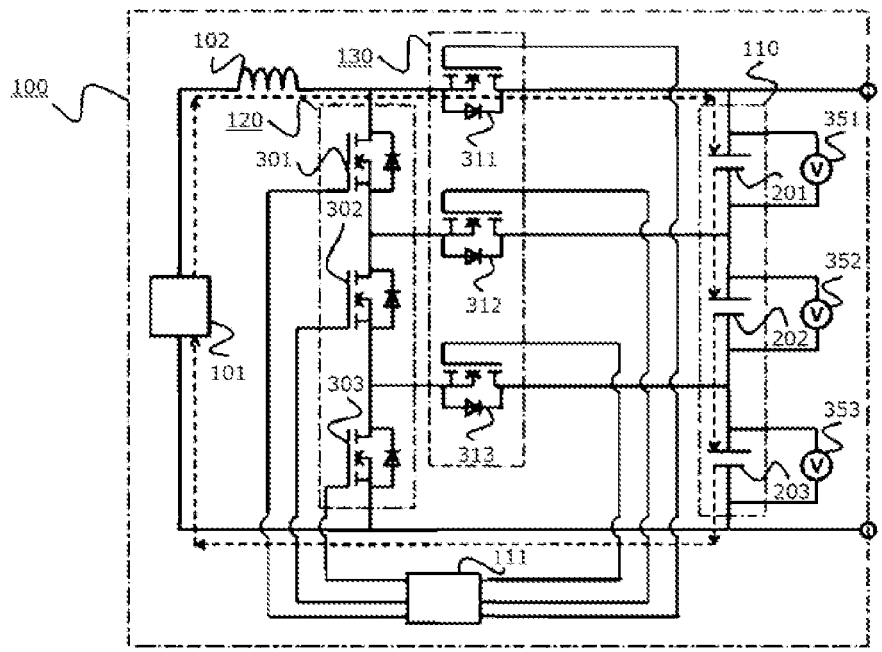

In FIG. 8A, the direction in which current flows when the switch 301 is in a conductive state is shown by broken line arrows. Current flows from the power storage mechanism 101 through the reactor 102, and the longer the conduction period of the switch 301 is, the more the current is amplified. In FIG. 8B, the direction in which current flows when the switch 301 is in a non-conductive state is shown by broken line arrows. The amplified current passes through the diode part of the switch 311, to flow to the units 201, 202, 203. Through repetitive switching of the switch 301 between a conductive state and a non-conductive state, the units 201, 202, 203 are charged, so that the voltages of the units 201, 202, 203 are increased.

FIG. 9 shows the relationship among a conductive state (ON), a non-conductive state (OFF), and repetitive switching (ON-OFF) between a conductive state and a non-conductive state, of the switches 301, 302, 303, 311, 312, 313 with respect to the unit(s) to be charged and the unit(s) to be discharged. In the configuration shown in FIG. 2, in the case of charging or discharging the unit(s), the unit 203 is always included as a unit to be charged or discharged.

In order to allow the above operations, the voltage of the power storage mechanism 101 needs to be lower than the voltage of the unit(s) 201 to 203 to be charged or discharged. Therefore, it is desirable that the power storage mechanism 101 always has voltage lower than the voltage of each unit, or is configured such that the voltage thereof is reduced to be lower than the voltage of each unit by discharging. In the case where the voltage of the power storage mechanism 101 configured such that the voltage is reduced to be lower than the voltage of each unit by discharging is higher than the voltage of one or more units to be charged or discharged, first, the units 201, 202, 203 are charged from the power storage mechanism 101, to reduce the voltage of the power storage mechanism 101. After the voltage of the power storage mechanism 101 becomes lower than the voltage of one or more units to be charged or discharged, power is passed or received therebetween. In the case where the amount of energy in the power storage mechanism 101 is small even though one or more units are required to be charged, operation is additionally performed so as to charge the power storage mechanism 101 from a plurality of the units within such a range that the voltage of the power storage mechanism 101 is lower than the voltage of one or more units to be charged or discharged.

The voltage measurement devices 351, 352, 353 measure the voltages of the units 201, 202, 203 and send the measurement information to the control operation section 111. When the voltage of any of the units is smaller or greater to some degree than the average of the voltages of the units, the control operation section 111 controls the switches 301 to 303, 311 to 313 so as to reduce the voltage difference. If there is a unit having a voltage difference greater or smaller than a reference value, the voltage difference of this unit is reduced through a procedure shown in FIG. 10.

FIG. 10 is a table showing procedures performed when the voltage of each of the units 201 to 203 is greater as compared to the average voltage and when the voltage is smaller as compared to the average voltage. In FIG. 10, in the case of including a second step, a first step and the second step may be replaced with each other. When the difference between the voltage of each unit and the average of the voltages of the units has become equal to or smaller than the reference value, the control operation section 111 determines that the voltages of the units are equalized, and brings all the switches into a non-conductive state.

Figure 11:
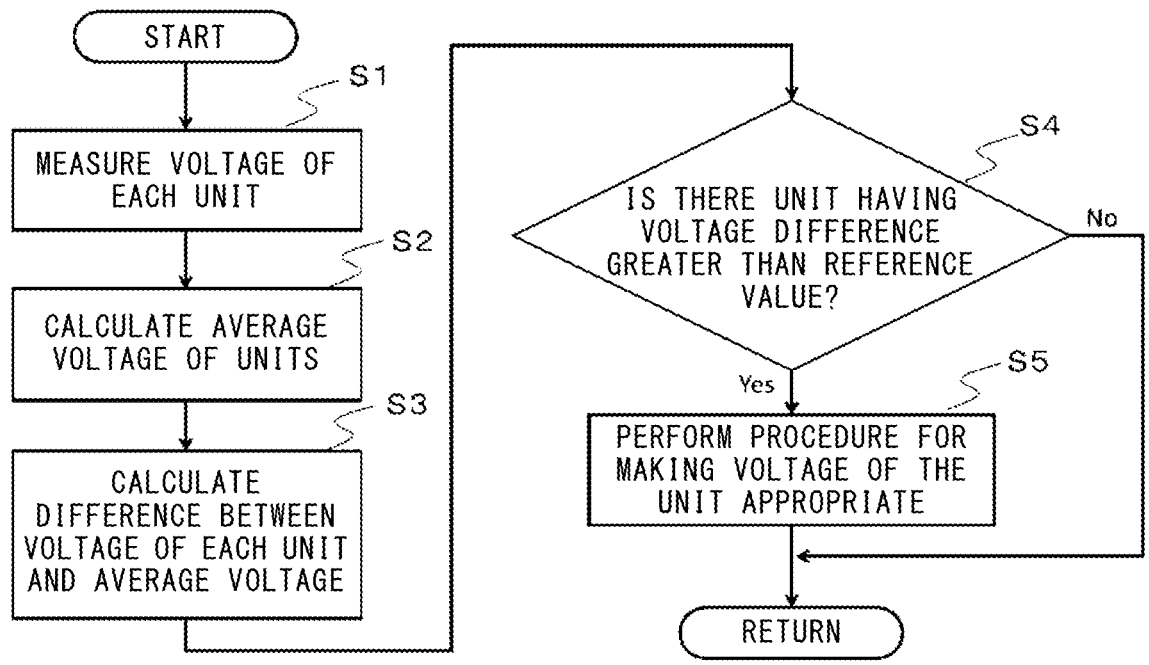
FIG. 11 shows a flowchart of operation of the power supply device according to embodiment 1 of the present invention.

FIG. 11 shows an example of a flowchart of operation of the power supply device according to embodiment 1. In FIG. 11, in step S1, the voltage of each unit is measured. In step S2, the average voltage of the units is calculated. In step S3, the difference between the voltage of each unit and the average voltage is calculated. In step S4, it is determined whether or not there is a unit for which the voltage difference calculated in step S3 exceeds the reference value. If there is a unit for which the voltage difference exceeds the reference value in step S4 (YES), the process proceeds to step S5 in which the step of adjusting the voltage of the corresponding unit to an appropriate value is performed in accordance with FIG. 10.

It is noted that the process does not necessarily have to follow this flowchart and the order of the steps may be changed.

Figure 12:
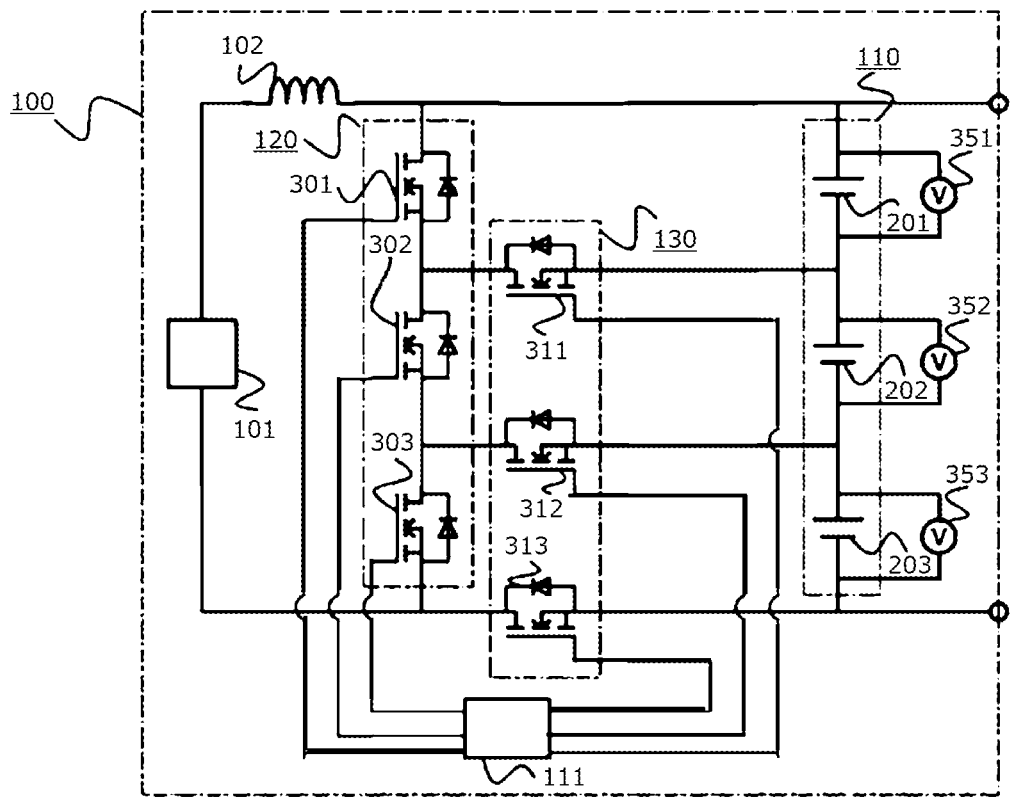
FIG. 12 is a diagram showing another configuration of the power supply device according to embodiment 1 of the present invention.

The above operation can be implemented also with a configuration shown in FIG. 12, instead of the configuration shown in FIG. 1. In the configuration shown in FIG. 12, the position of the second switch group 130 and the directions of the switches 311 to 313 composing the second switch group 130 are changed as compared to the configuration shown in FIG. 1 in embodiment 1.

That is, the source-side terminal of the switch 301 and the drain-side terminal of the switch 311 are connected to each other, the source-side terminal of the switch 311 is connected to the negative electrode of the unit 201, and the voltage measurement device 351 is connected in parallel to the unit 201. This forms a configuration stage for one unit.

That is, the configuration stage including the unit 201, the switches 301, 311, and the voltage measurement device 351 is defined as a first stage. A second configuration stage includes the unit 202, the switches 302, 312, and the voltage measurement device 352, and a third configuration stage includes the unit 203, the switches 303, 313, and the voltage measurement device 353. The connection relationships in the second stage and the third stage are the same as that in the first stage, and the description thereof is omitted.

In the configuration shown in FIG. 12, in the case of charging or discharging the unit(s), the unit 201 is always included as a unit to be charged or discharged. FIG. 13 shows the relationship among a conductive state (ON), a non-conductive state (OFF), and repetitive switching (ON-OFF) between a conductive state and a non-conductive state, of the switches, with respect to the unit(s) to be charged and the unit(s) to be discharged. FIG. 14 shows procedures performed when the difference from the average voltage of the units is greater than a reference value. The contents in FIG. 13 and FIG. 14 are substantially the same as those in FIG. 9 and FIG. 10, and therefore the description thereof is omitted.

Further, if a state-of-charge measurement device for measuring the state of charge of each unit is provided instead of the voltage measurement device, an effect of suppressing variation among the states of charge is obtained also for a unit in which the amount of change in the voltage due to change in the state of charge is small. In the case of providing the state-of-charge measurement devices, equalization of the states of charge can be implemented by replacing "voltage" written in FIG. 10, FIG. 11, and FIG. 14 with "state of charge".

Through the operations described above, when there is variation among the voltages or the states of charge of the units 201 to 203 included in the module 110, the power supply device 100 according to embodiment 1 can reduce the variation. In addition, this circuit is a small-sized circuit in which the number of reactors and the number of capacitors of units are not proportional to the number of configuration stages. Thus, it is possible to actively pass and receive power between the power storage mechanism and one or more units, with a small-sized and simple configuration using a smaller number of switches as compared to the conventional configuration.

Embodiment 2

Next, a power supply device according to embodiment 2 of the present invention will be described with reference to FIG. 15 to FIG. 17.

Figure 15:
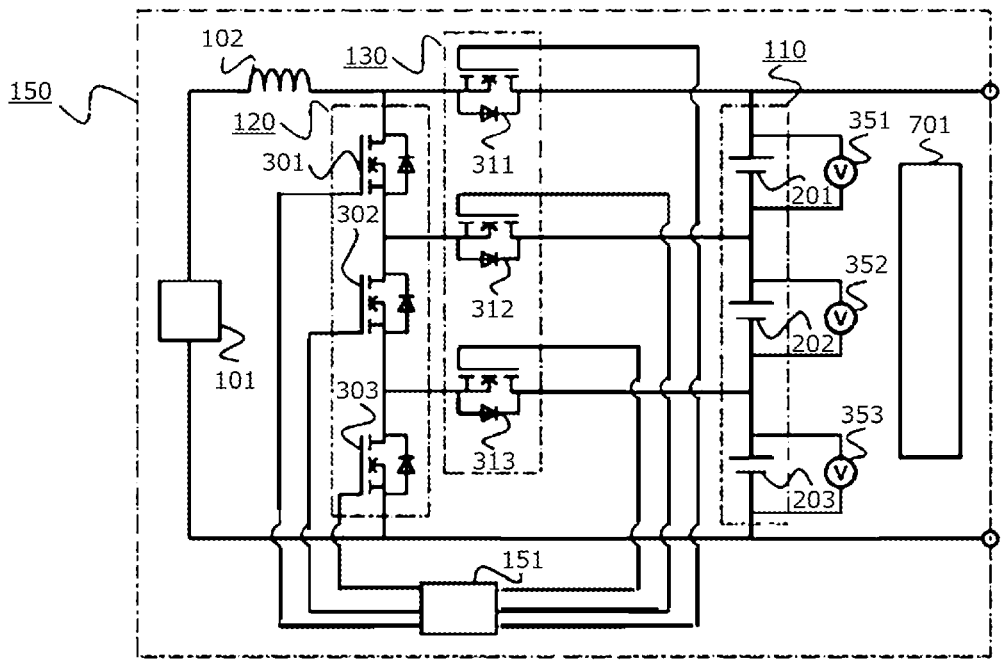
FIG. 15 is a diagram showing the configuration of a power supply device according to embodiment 2 of the present invention.

FIG. 15 shows the configuration of the power supply device according to embodiment 2 of the present invention. A power supply device 150 according to embodiment 2 includes a power storage mechanism 101, a reactor 102, a module 110, a first switch group 120 including a plurality of switches 301 to 303, a second switch group 130 including a plurality of switches 311 to 313, voltage measurement devices 351, 352, 353, a temperature measurement device 701, and a control operation section 151. The module 110 includes units 201, 202, 203.

In the power supply device 150 shown in FIG. 15, the configuration except for the temperature measurement device 701 is the same as that shown in FIG. 2 in embodiment 1. Therefore, the same or corresponding parts are denoted by the same reference characters and the description thereof is omitted. The control operation section 151 receives information about the voltages of the units 201 to 203 detected by the voltage measurement devices 351, 352, 353 and the temperature of the module 110 measured by the temperature measurement device 701, and outputs signals to the gate-side terminals of the switches 301 to 303, 311 to 313, to switch each switch between a conductive state and a non-conductive state.

The temperature measurement device 701 measures the temperature of the module 110 and sends the measurement information to the control operation section 151. When the measured temperature is smaller than a predetermined reference value, discharging from the units 201, 202, 203 to the power storage mechanism 101 and charging from the power storage mechanism 101 to the units 201, 202, 203 are repetitively performed. Thus, heat is generated due to the internal resistances of the units 201, 202, 203, whereby the temperatures of the units 201, 202, 203 can be increased. When the measured temperature is greater than the predetermined reference value, the temperature increasing function of the power supply device 150 according to embodiment 2 is stopped. Thereafter, operation for reducing variations in the voltages of the units as described in embodiment 1 is performed as necessary. The details of this operation will not be described in order to avoid repetition of the same description.

Figure 16:
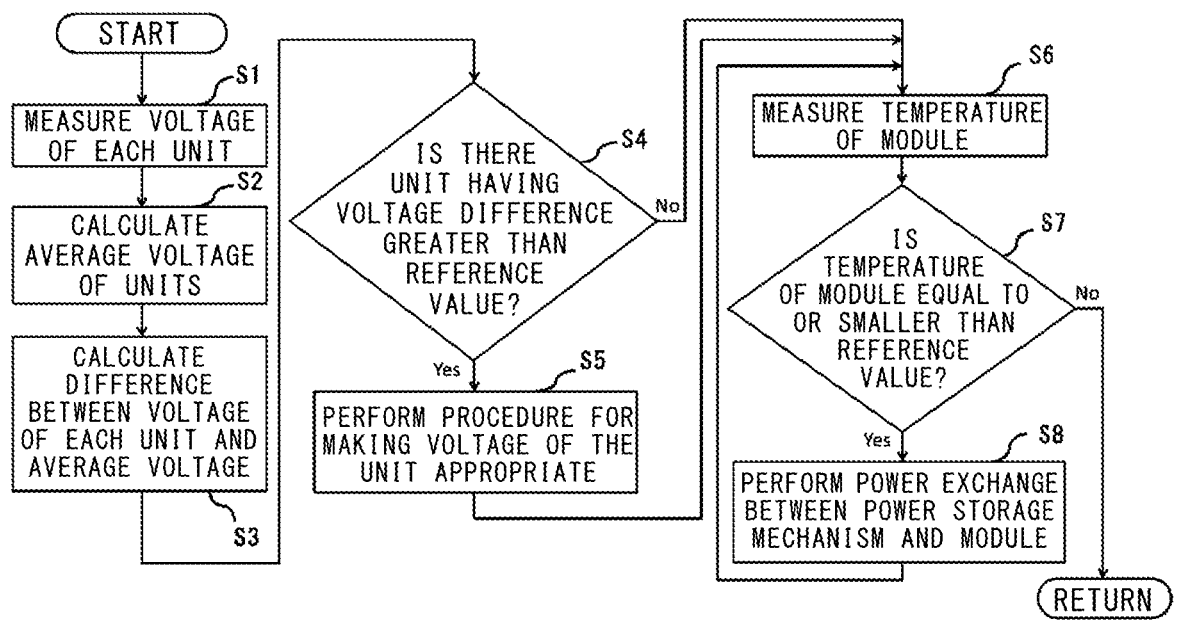
FIG. 16 shows a flowchart of operation of the power supply device according to embodiment 2 of the present invention.

FIG. 16 shows an example of a flowchart of operation of the power supply device according to embodiment 2. In FIG. 16, steps S1 to S5 are the same as those in the flowchart described in FIG. 11, and therefore the description thereof is omitted. In step S6, the temperature of the module 110 is measured by the temperature measurement device 701. In step S7, it is determined whether or not the temperature of the module 110 is equal to or smaller than the reference value. If the temperature is equal to or smaller than the reference value (YES), the process proceeds to step S8 in which the step of adjusting the voltage of the corresponding unit to an appropriate value is performed as in step S5. On the other hand, if the temperature of the module 110 is not equal to or smaller than the reference value in step S7 (NO), the process returns to the start.

It is noted that the process does not necessarily have to follow this flowchart and the order of the steps may be changed.

Figure 17:
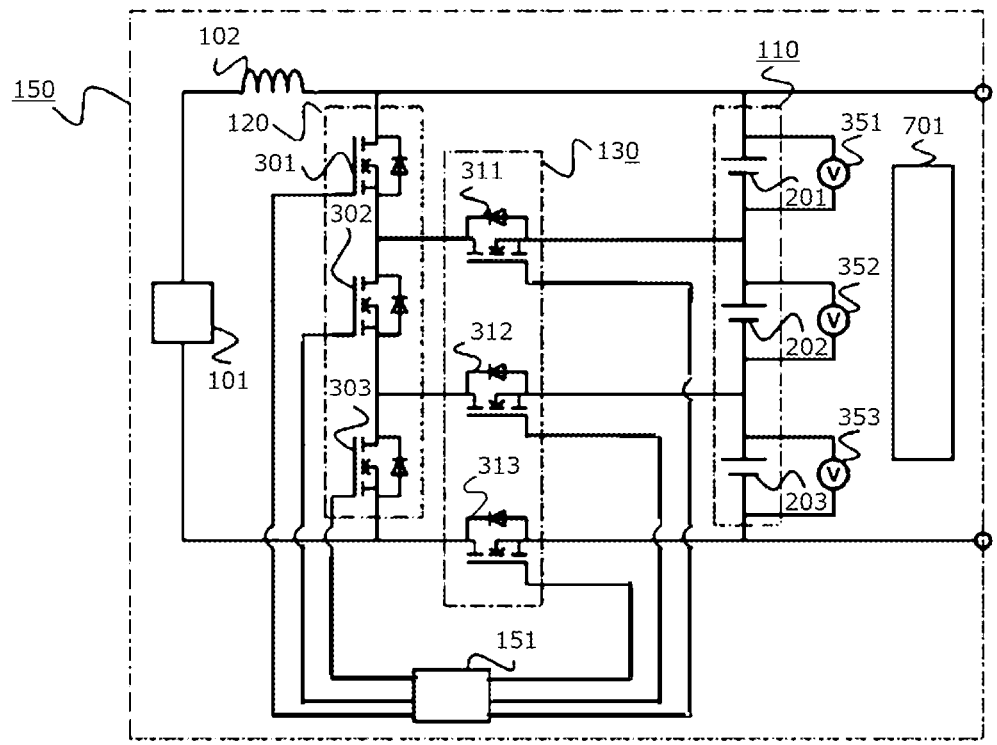
FIG. 17 is a diagram showing another configuration of the power supply device according to embodiment 2 of the present invention.

The above operation can be implemented also with a configuration shown in FIG. 17, instead of the configuration shown in FIG. 15. The configuration shown in FIG. 17 is made such that, in the configuration shown in FIG. 12 in embodiment 1, the temperature measurement device 701 for measuring the temperature of the module 110 is provided and the temperature information of the module 110 measured by the temperature measurement device 701 is sent to the control operation section 151. The same or corresponding parts are denoted by the same reference characters and the description thereof is omitted.

In the configuration shown in FIG. 17, in the case of charging or discharging the unit(s), the unit 201 is always included as a unit to be charged or discharged. The details of the operation will not be described in order to avoid repetition of the same description.

Further, if a state-of-charge measurement device for measuring the state of charge of each unit is provided instead of the voltage measurement device, an effect of suppressing variation among the states of charge is obtained also for a unit in which the amount of change in the voltage due to change in the state of charge is small. In the case of providing the state-of-charge measurement devices, equalization of the states of charge can be implemented by replacing "voltage" written in FIG. 16 with "state of charge".

Through the operations described above, when there is variation among the voltages or the states of charge of the units 201 to 203 included in the module 110, the power supply device 150 according to embodiment 2 can reduce the variation. In addition, when the temperature of the module 110 is smaller than the reference value, the temperature of the module 110 can be increased.

Embodiment 3

Next, a power supply device according to embodiment 3 of the present invention will be described with reference to FIG. 18 to FIG. 21.

Figure 18:
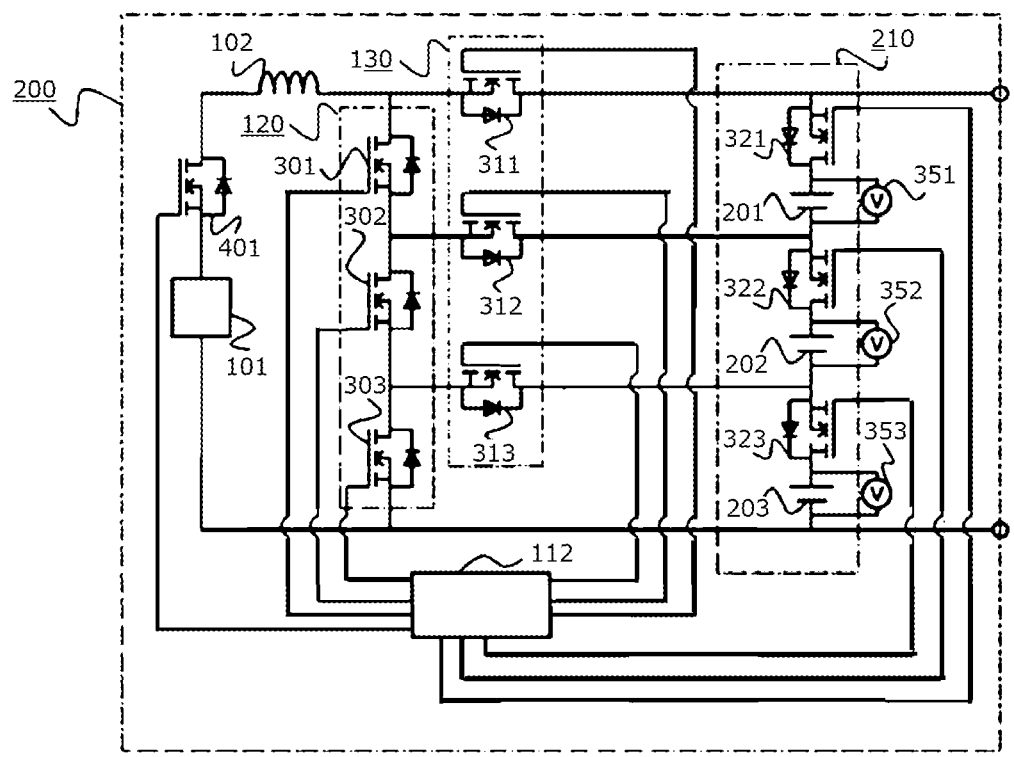
FIG. 18 is a diagram showing the configuration of a power supply device according to embodiment 3 of the present invention.

FIG. 18 shows the configuration of the power supply device according to embodiment 3 of the present invention. A power supply device 200 according to embodiment 3 includes a power storage mechanism 101, a reactor 102, a switch 401 connected between the power storage mechanism 101 and the reactor 102, a module 210, a first switch group 120 including a plurality of switches 301 to 303, a second switch group 130 including a plurality of switches 311 to 313, voltage measurement devices 351, 352, 353, and a control operation section 112. The module 210 includes units 201, 202, 203, and separation switches 321, 322, 323 connected in series to the respective units.

It is noted that each unit 201 to 203 may be a single power storage device or may be formed by a combination of a plurality of power storage devices. In addition, the power storage device may be a secondary cell or may be a device having a power storage function, such as a capacitor or an electric double layer capacitor. The switches may have body diodes therein, or may be formed by combining a diode with a switching element not having a body diode. Preferably, the switches 301, 302, 303, 311, 312, 313 are MOSFETs.

The drain-side terminal of the switch 301 and the source-side terminal of the switch 311 are connected to each other, the drain-side terminal of the switch 311 is connected to the source-side terminal of the switch 321, the drain-side terminal of the switch 321 is connected to the positive electrode of the unit 201, and the voltage measurement device 351 is connected in parallel to the unit 201. This forms a configuration stage for one unit. That is, the configuration stage including the unit 201, the switches 301, 311, 321, and the voltage measurement device 351 is defined as a first stage.

A second configuration stage includes the unit 202, the switches 302, 312, 322, and the voltage measurement device 352, and as in the first stage, the drain-side terminal of the switch 302 and the source-side terminal of the switch 312 are connected to each other, the drain-side terminal of the switch 312 is connected to the source-side terminal of the switch 322, the drain-side terminal of the switch 322 is connected to the positive electrode of the unit 202, and the voltage measurement device 352 is connected in parallel to the unit 202. The negative electrode of the unit 201 and the source-side terminal of the switch 322 are connected to each other, and the source-side terminal of the switch 301 and the drain-side terminal of the switch 302 are connected to each other.

Similarly, a third configuration stage includes the unit 203, the switches 303, 313, 323, and the voltage measurement device 353. The drain-side terminal of the switch 303 and the source-side terminal of the switch 313 are connected to each other, the drain-side terminal of the switch 313 is connected to the source-side terminal of the switch 323, the drain-side terminal of the switch 323 is connected to the positive electrode of the unit 203, and the voltage measurement device 353 is connected in parallel to the unit 203. The negative electrode of the unit 202 and the source-side terminal of the switch 323 are connected to each other, and the source-side terminal of the switch 302 and the drain-side terminal of the switch 303 are connected to each other.

The negative electrode of the unit 203 and the source-side terminal of the switch 303 are connected to each other, and a unit including the power storage mechanism 101, the reactor 102, and the switch 401 which are connected in series is connected to the drain-side terminal of the switch 301 and the source-side terminal of the switch 303.

Both the positive-side and negative-side terminals of the module 210 including the units 201, 202, 203 and the switches 321, 322, 323 are connected to the electric device 180 shown in FIG. 1. Information about voltages detected by the voltage measurement devices 351, 352, 353 is sent to the control operation section 112, and the control operation section 112 outputs signals to the gate-side terminals of the switches 301, 311, 302, 312, 303, 313, 321, 322, 323, 401, to switch each switch between a conductive state and a non-conductive state.

It is noted that the number of the units 201 to 203 may be other than three, and also, the number of the configuration stages may be other than three. The switch 321 to 323 connected in series to the units 201 to 203 may be connected in a reversed order. Preferably, the power storage mechanism 101 is a capacitor or a secondary cell.

In embodiment 3, the control operation section 112 includes a function of determining normality/defect as to whether or not the units 201 to 203 normally operate. In such a case where one or more of the units included in the module 210 are significantly deteriorated, the usage range of the defective unit is narrowed and assumed usage of the module 210 becomes difficult. On the basis of the voltage of each unit, the control operation section 112 determines the unit for which assumed usage has become difficult, as a defective unit, and switches each switch between a conductive state and a non-conductive state so that current flowing between the electric device 180 and the module 210 bypasses the defective unit.

Figure 19:
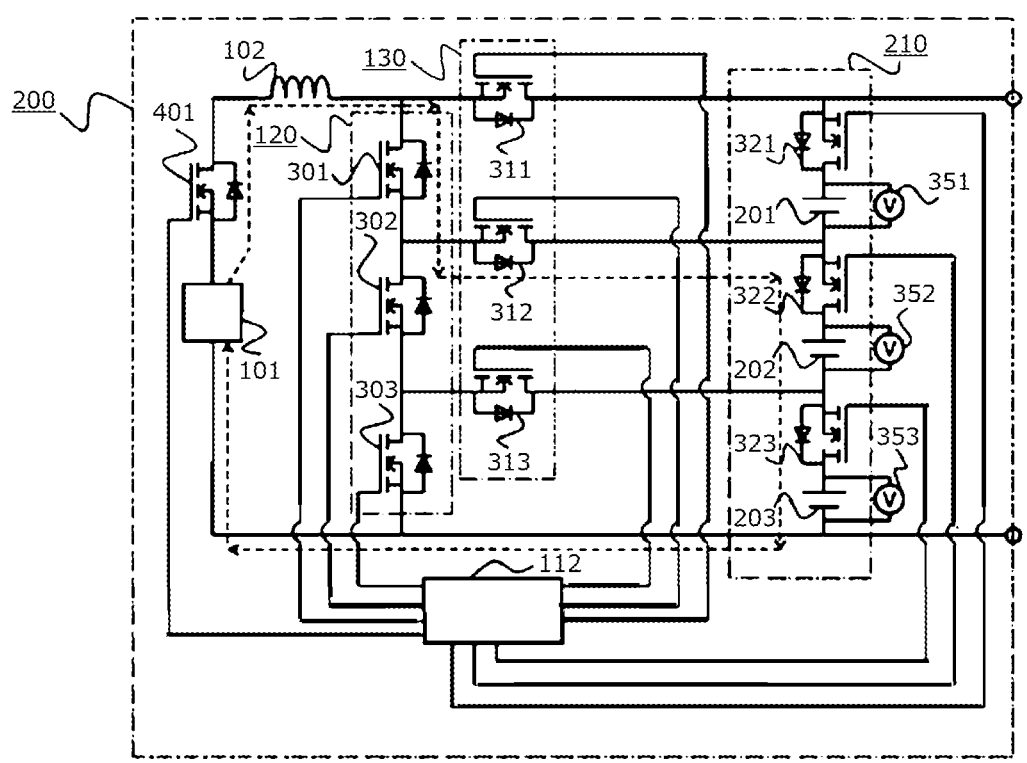
FIG. 19 is a diagram showing current bypassing a unit in the power supply device according to embodiment 3 of the present invention.

The operation will be described with reference to FIG. 19. In the case where the unit 201 is determined to be defective, the switches 321, 401 connected in series to the unit 201 are brought into a non-conductive state, and the switches 301, 311, 312 are brought into a conductive state. The current flowing between the electric device 180 and the module 210 passes through the switches 301, 311, 312 without passing through the unit 201, as shown by broken line arrows. Similarly, in the case where a unit other than the unit 201 is determined to be defective, the switch connected in series to the defective unit and the switch 401 are brought into a non-conductive state, and the switch connected in parallel to the defective unit is brought into a conductive state so that the current bypasses the defective unit.

In the case where there are no units that are determined to be defective, the switches 321, 322, 323 are maintained in a conductive state. The voltage measurement devices 351, 352, 353 measure the voltages of the units 201, 202, 203, and send the measurement information to the control operation section 112. When the voltage of any of the units is smaller or greater to some degree than the average of the voltages of the units, the control operation section 112 controls the switches so as to reduce the voltage difference. If there is a unit having a voltage difference greater than a reference value, the voltage difference of this unit is reduced. When variations in the voltages of the units have become lower than a certain level, the control operation section 112 determines that the voltages of the units are equalized, and brings all the switches into a non-conductive state. In the configuration shown in FIG. 18, in the case of charging or discharging the unit(s), the unit 203 is always included as a unit to be charged or discharged. The details of the operation and the procedure will not be described in order to avoid repetition of the same description.

Figure 20:
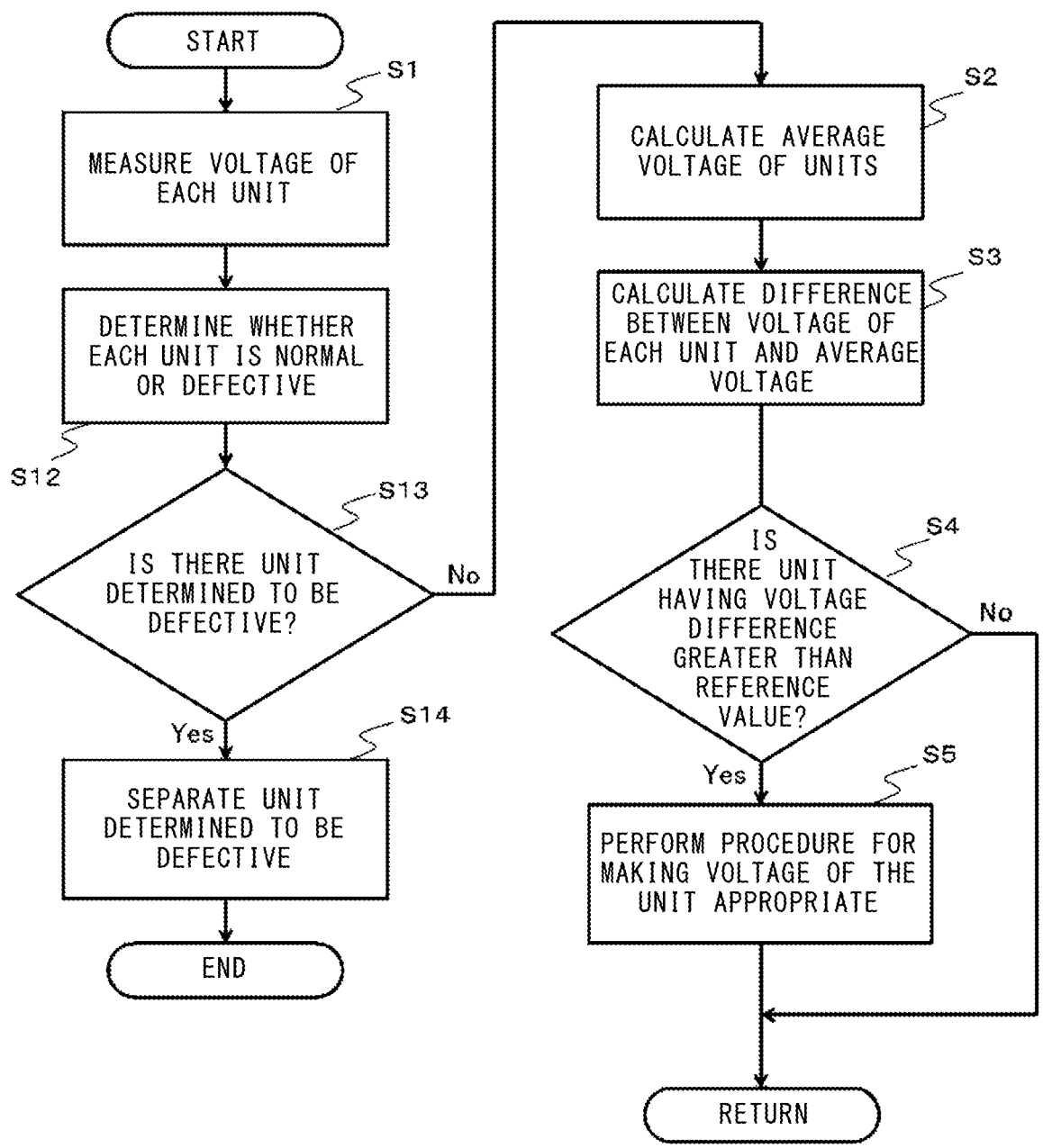
FIG. 20 shows a flowchart of operation of the power supply device according to embodiment 3 of the present invention.

FIG. 20 shows an example of a flowchart of operation of the power supply device according to embodiment 3. In FIG. 20, in step S1, the voltage of each unit is measured. In step S12, whether each unit is normal or defective is determined. In step S13, it is determined whether or not there is a unit that is determined to be defective. If there is a defective unit (YES), the process proceeds to step S14 to separate the unit determined to be defective. If there are no units that are determined to be defective in step S13 (NO), the process proceeds to step S2 to calculate the average voltage of the units. Steps S2 to S5 are the same as those in the flowchart described in FIG. 11, and therefore the description thereof is omitted.

It is noted that the process does not necessarily have to follow this flowchart and the order of the steps may be changed.

Figure 21:
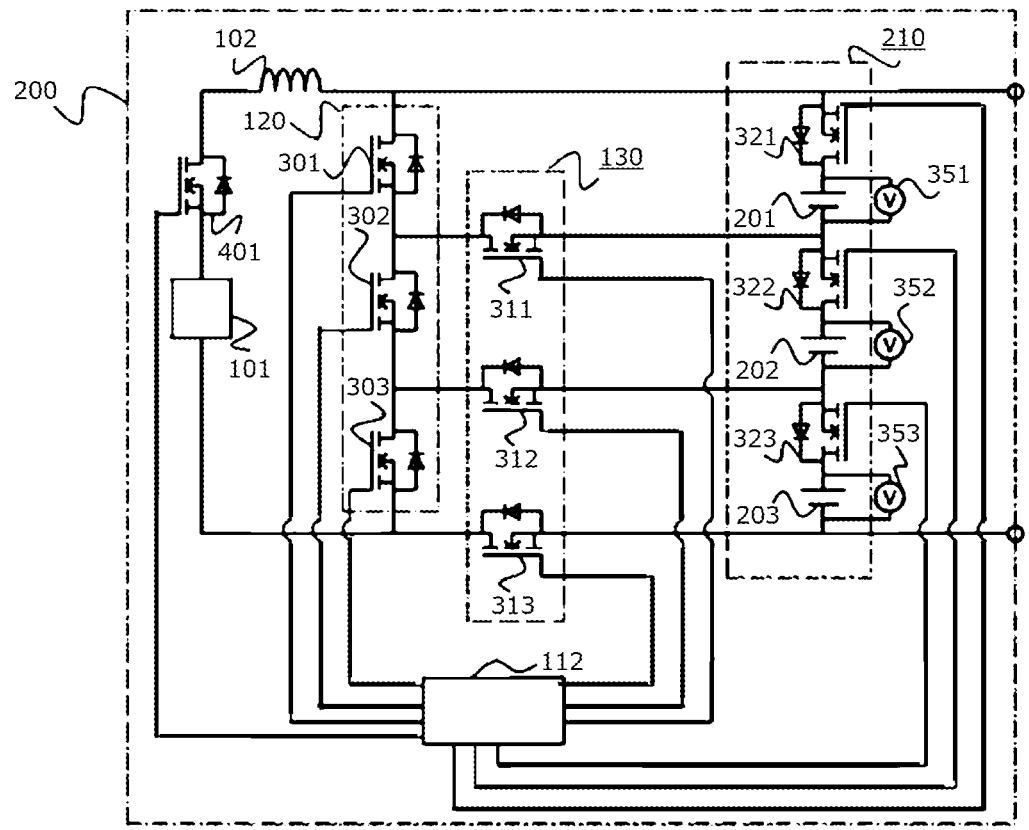
FIG. 21 is a diagram showing another configuration of the power supply device according to embodiment 3 of the present invention.

The above operation can be implemented also with a configuration shown in FIG. 21, instead of the configuration shown in FIG. 18. In the configuration shown in FIG. 21, the position of the second switch group 130 and the directions of the switches 311 to 313 composing the second switch group 130 are changed as compared to the configuration shown in FIG. 18 in embodiment 3.

That is, the source-side terminal of the switch 301 and the drain-side terminal of the switch 311 are connected to each other, the source-side terminal of the switch 311 is connected to the negative electrode of the unit 201, the drain-side terminal of the switch 321 is connected to the positive electrode of the unit 201, and the voltage measurement device 351 is connected in parallel to the unit 201. This forms a configuration stage for one unit.

That is, the configuration stage including the unit 201, the switches 301, 311, 321, and the voltage measurement device 351 is defined as a first stage. A second configuration stage includes the unit 202, the switches 302, 312, 322, and the voltage measurement device 352, and a third configuration stage includes the unit 203, the switches 303, 313, 323, and the voltage measurement device 353. The connection relationships in the second stage and the third stage are the same as that in the first stage, and the description thereof is omitted.

In the configuration shown in FIG. 21, in the case of charging or discharging the unit(s), the unit 201 is always included as a unit to be charged or discharged. The details of the operation will not be described in order to avoid repetition of the same description.

Further, if a state-of-charge measurement device for measuring the state of charge of each unit is provided instead of the voltage measurement device, an effect of suppressing variation among the states of charge is obtained also for a unit in which the amount of change in the voltage due to change in the state of charge is small. In the case of providing the state-of-charge measurement devices, equalization of the states of charge can be implemented by replacing "voltage" written in steps S2 to S5 in FIG. 20 with "state of charge".

Through the operations described above, when there is variation among the voltages or the states of charge of the units included in the module 210, the power supply device 200 according to embodiment 3 can reduce the variation, and power can be actively passed and received between the power storage mechanism and one or more units. In addition, when there is a defective unit the usage of which has become difficult for such a reason that the power storage device in this unit has been significantly deteriorated, the defective unit can be electrically separated.

Embodiment 4

Next, a power supply device according to embodiment 4 of the present invention will be described with reference to FIG. 22 to FIG. 24.

Figure 22:
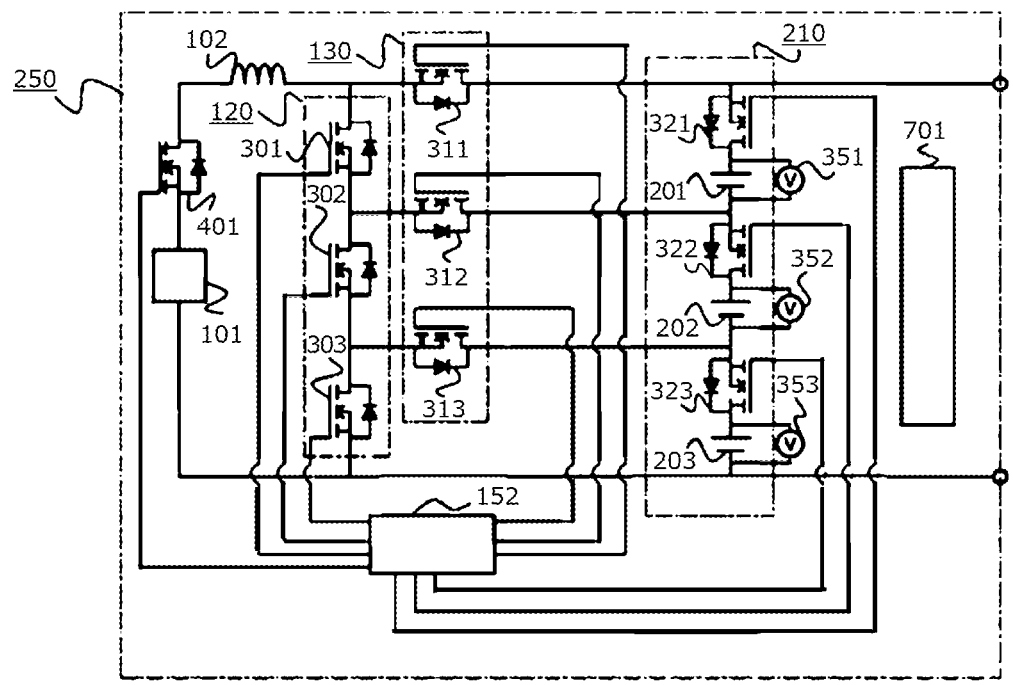
FIG. 22 is a diagram showing the configuration of a power supply device according to embodiment 4 of the present invention.

FIG. 22 shows the configuration of the power supply device according to embodiment 4 of the present invention. A power supply device 250 includes a power storage mechanism 101, a reactor 102, a switch 401 connected between the power storage mechanism 101 and the reactor 102, a module 210, a first switch group 120 including a plurality of switches 301 to 303, a second switch group 130 including a plurality of switches 311 to 313, voltage measurement devices 351, 352, 353, a temperature measurement device 701, and a control operation section 152. The module 210 includes units 201, 202, 203 and switches 321, 322, 323.

In the power supply device 250 shown in FIG. 22, the configuration except for the temperature measurement device 701 is the same as that shown in FIG. 18 in embodiment 3. Therefore, the same or corresponding parts are denoted by the same reference characters and the description thereof is omitted. The control operation section 152 receives information about the voltages of the units 201 to 203 detected by the voltage measurement devices 351, 352, 353 and the temperature of the module 210 measured by the temperature measurement device 701, and outputs signals to the gate-side terminals of the switches 301 to 303, 311 to 313, 321 to 323, 401, to switch each switch between a conductive state and a non-conductive state.

It is noted that the number of the units may be other than three, and also, the number of the configuration stages may be other than three. The switches connected in series to the units may be connected in a reversed order. Preferably, the power storage mechanism 101 is a capacitor or a secondary cell.

In the power supply device 250 shown in FIG. 22, operation in the case where the unit 201 is determined to be defective and operation in the case where there are no units that are determined to be defective are the same as those in the configuration shown in FIG. 18. Therefore, the description thereof is omitted.

The temperature measurement device 701 measures the temperature of the module 210 and sends the measurement information to the control operation section 152. When the measured temperature is smaller than a predetermined reference value, discharging from the units 201, 202, 203 to the power storage mechanism 101 and charging from the power storage mechanism 101 to the units 201, 202, 203 are repetitively performed. Thus, heat is generated due to the internal resistances of the units 201, 202, 203, whereby the temperatures of the units 201, 202, 203 can be increased. When the measured temperature is greater than the predetermined reference value, the temperature increasing function is stopped. Thereafter, operation for reducing variations in the voltages of the units as described in embodiment 3 is performed as necessary.

Figure 23:
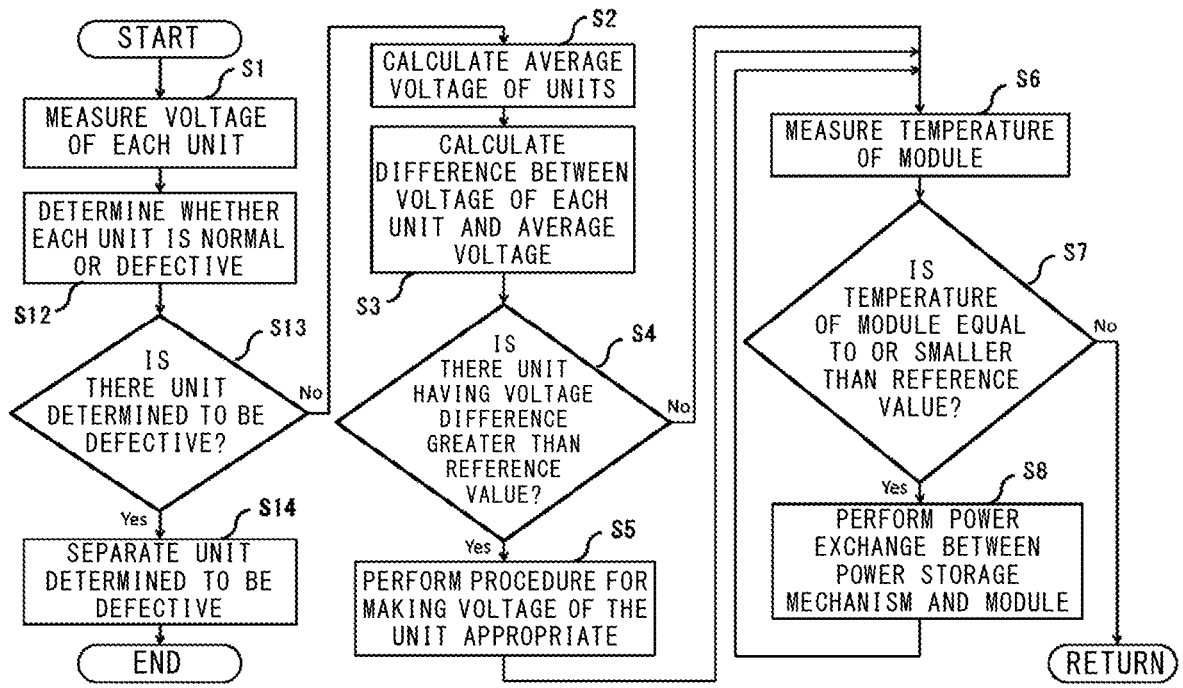
FIG. 23 shows a flowchart of operation of the power supply device according to embodiment 4 of the present invention.

FIG. 23 shows an example of a flowchart of operation of the power supply device according to embodiment 4. In FIG. 23, step S1, steps S12 to S14 subsequent to step S1, and steps S2 to S5 subsequent to step S13 are the same as those in the flowchart described in FIG. 20, and therefore the description thereof is omitted. In addition, steps S6 to S8 subsequent to step S5 are the same as those in the flowchart described in FIG. 16, and therefore the description thereof is omitted.

It is noted that the process does not necessarily have to follow this flowchart and the order of the steps may be changed.

Figure 24:
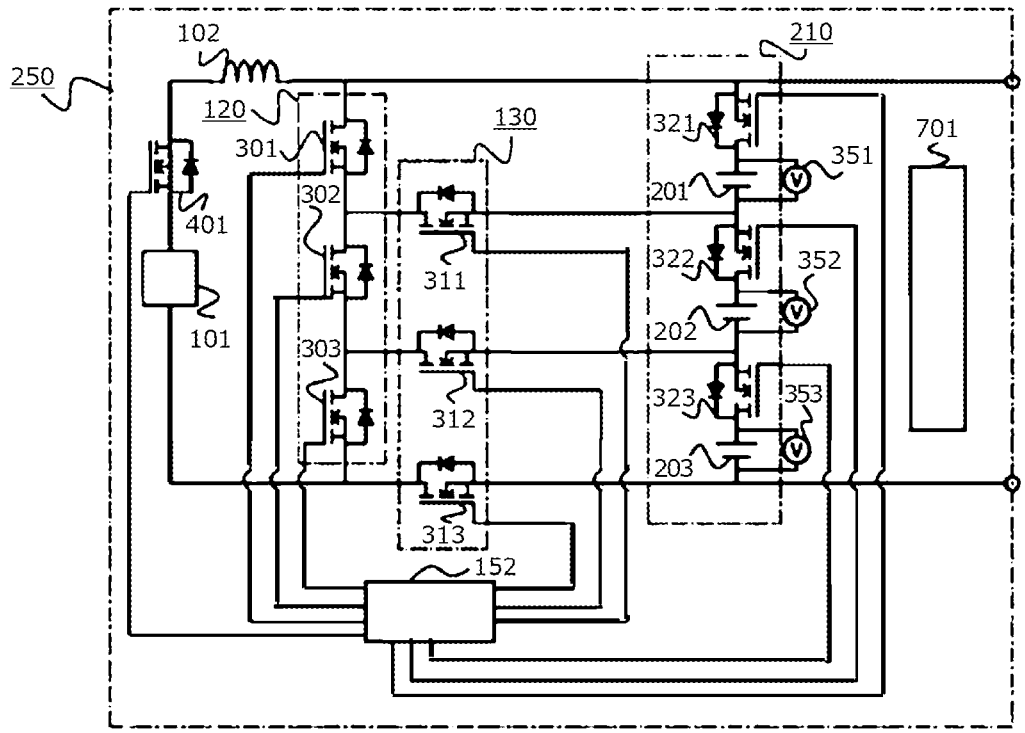
FIG. 24 is a diagram showing another configuration of the power supply device according to embodiment 4 of the present invention.

The above operation can be implemented also with a configuration shown in FIG. 24, instead of the configuration shown in FIG. 22. In the configuration shown in FIG. 24, the position of the second switch group 130 and the directions of the switches 311 to 313 composing the second switch group 130 are changed as compared to the configuration shown in FIG. 22 in embodiment 4.

That is, the source-side terminal of the switch 301 and the drain-side terminal of the switch 311 are connected to each other, the source-side terminal of the switch 311 is connected to the negative electrode of the unit 201, the drain-side terminal of the switch 321 is connected to the positive electrode of the unit 201, and the voltage measurement device 351 is connected in parallel to the unit 201. This forms a configuration stage for one unit.

That is, the configuration stage including the unit 201, the switches 301, 311, 321, and the voltage measurement device 351 is defined as a first stage. A second configuration stage includes the unit 202, the switches 302, 312, 322, and the voltage measurement device 352, and a third configuration stage includes the unit 203, the switches 303, 313, 323, and the voltage measurement device 353. The connection relationships in the second stage and the third stage are the same as that in the first stage, and the description thereof is omitted.

In the configuration shown in FIG. 24, in the case of charging or discharging the unit(s), the unit 201 is always included as a unit to be charged or discharged. The details of the operation will not be described in order to avoid repetition of the same description.

Further, if a state-of-charge measurement device for measuring the state of charge of each unit is provided instead of the voltage measurement device, an effect of suppressing variation among the states of charge is obtained also for a unit in which the amount of change in the voltage due to change in the state of charge is small. In the case of providing the state-of-charge measurement devices, equalization of the states of charge can be implemented by replacing "voltage" written in steps S2 to S5 in FIG. 23 with "state of charge".

Through the operations described above, when there is variation among the voltages or the states of charge of the units included in the module, the power supply device 250 according to embodiment 4 can reduce the variation.

In addition, when the temperature of the module is smaller than the reference value, the temperature of the module can be increased. Further, when there is a defective unit, the defective unit can be electrically separated.

Embodiment 5

Next, a power supply device according to embodiment 5 of the present invention will be described with reference to FIG. 25 to FIG. 27.

A power supply device 300 according to embodiment 5 includes a power storage mechanism 101, a reactor 102, switches 401, 512, 513, a module 210, a first switch group 120 including a plurality of switches 301 to 303, a second switch group 130 including a plurality of switches 311 to 313, voltage measurement devices 351, 352, 353, and a control operation section 113. The module 210 includes units 201, 202, 203 and switches 321, 322, 323.

The power supply device 300 according to embodiment 5 is configured such that the switches 512 and 513 are added in the configuration shown in FIG. 18 in embodiment 3. Other than the switches 512 and 513, the same or corresponding parts as those in FIG. 18 are denoted by the same reference characters and the description thereof is omitted.

The switch 512 has a drain-side terminal connected to a connection point between the power storage mechanism 101 and the switch 401, and a source-side terminal connected to the source-side terminal of the switch 303 and the negative electrode of the unit 203. The switch 513 has a drain-side terminal connected to the negative electrode of the unit 203 and the source-side terminal of the switch 512, and a source-side terminal connected to the negative side of the power storage mechanism 101.

A unit including the power storage mechanism 101, the reactor 102, and the switch 401 which are connected in series is connected to the drain-side terminal of the switch 301 and the source-side terminal of the switch 513.

The positive-side terminal of the module 210 including the units 201, 202, 203 and the switches 321, 322, 323, and the negative-side terminal of the power storage mechanism 101, are connected to the electric device 180 shown in FIG. 1.

Information about the voltages detected by the voltage measurement devices 351, 352, 353 is sent to the control operation section 113. When the voltage of any of the units is smaller or greater to some degree than the average of the voltages of the plurality of units, the control operation section 113 outputs signals to the gate-side terminals of the switches 301, 311, 302, 312, 303, 313, 321, 322, 323, 401, 512, 513, to switch each switch between a conductive state and a non-conductive state.

It is noted that the number of the units 201, 202, 203 may be other than three, and also, the number of the configuration stages may be other than three. The switches 321 to 323 connected in series to the units may be connected in a reversed order.

Preferably, the power storage mechanism 101 is a secondary cell, an assembled battery, a capacitor, or an electric double layer capacitor. More preferably, the power storage mechanism 101 is a unit having property equal to those of the units 201, 202, 203.

In the power supply device 300 according to embodiment 5, the control operation section 113 includes a function of determining whether or not the units 201, 202, 203 are normal or defective. On the basis of the voltage of each unit, the control operation section 113 determines the unit for which assumed usage has become difficult, as a defective unit, and switches each switch between a conductive state and a non-conductive state so that current flowing between the electric device and the module 210 bypasses the defective unit. Further, the power storage mechanism 101 is caused to be electrically connected in series to the module 210, in order to prevent the voltage of the module 210 from being reduced when the unit determined to be defective is electrically separated.

The operation will be described with reference to FIG. 25. In the case where the unit 201 is determined to be defective, the switches 321, 401 connected in series to the unit 201 are brought into a non-conductive state, and the switches 301, 311, 312 are brought into a conductive state. Further, the switch 513 is switched to a non-conductive state, and the switch 512 is switched to a conductive state. Thus, current flowing between the electric device and the module 210 passes through the switches 301, 311, 312, 512, the units 202, 203, and the power storage mechanism 101 without passing through the unit 201. Similarly, in the case where a unit other than the unit 201 is determined to be defective, the switch connected in series to the defective unit and the switches 401, 513 are brought into a non-conductive state, and the switch connected in parallel to the defective unit and the switch 512 are brought into a conductive state so that the current bypasses the defective unit.

In the case where there are no units that are determined to be defective, the switch 512 is brought into a non-conductive state, and the switches 321, 322, 323, 401, 513 are brought into a conductive state. The voltage measurement devices 351, 352, 353 measure the voltages of the units 201, 202, 203, and send the measurement information to the control operation section 113. When the voltage of any of the units is smaller or greater to some degree than the average of the voltages of the units, the control operation section 113 controls the switches so as to reduce the voltage difference. If there is a unit having a voltage difference greater than a reference value, the voltage difference of this unit is reduced. When variations in the voltages of the units have become lower than a certain level, the control operation section 113 determines that the voltages of the units are equalized, and brings all the switches into a non-conductive state. In the configuration shown in FIG. 25, in the case of charging or discharging the unit(s), the unit 203 is always included as a unit to be charged or discharged. The details of the operation and the procedure will not be described in order to avoid repetition of the same description.

Figure 26:
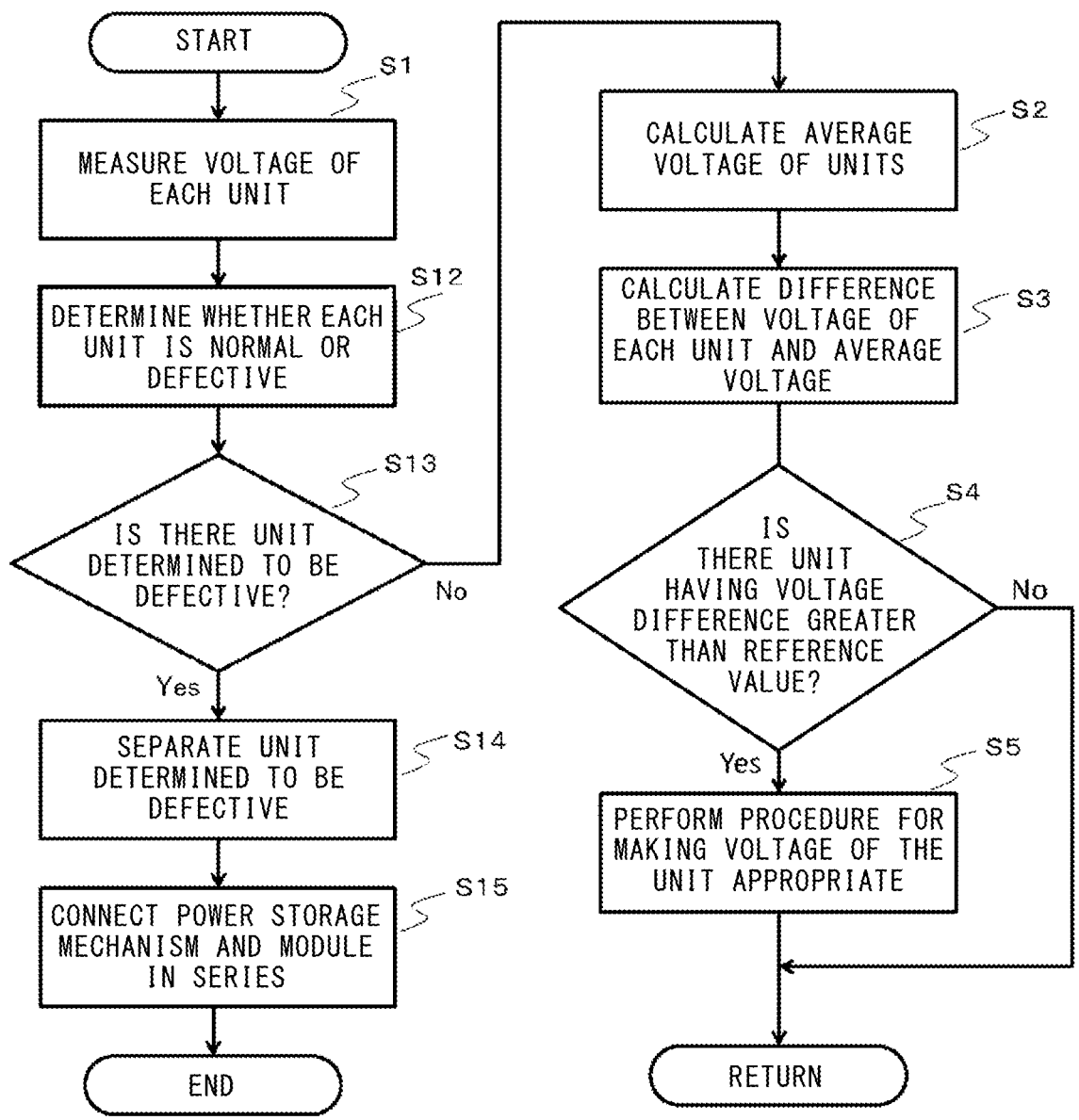
FIG. 26 shows a flowchart of operation of the power supply device according to embodiment 5 of the present invention.

FIG. 26 shows an example of a flowchart of operation of the power supply device according to embodiment 5. In FIG. 26, step S1, steps S12 to S14 subsequent to step S1, and steps S2 to S5 subsequent to step S13 are the same as those in the flowchart described in FIG. 20, and therefore the description thereof is omitted. In step S15 subsequent to step S14, the module 210 from which the unit determined to be defective has been separated, and the power storage mechanism 101, are directly connected to each other.

It is noted that the process does not necessarily have to follow this flowchart and the order of the steps may be changed.

Figure 25:
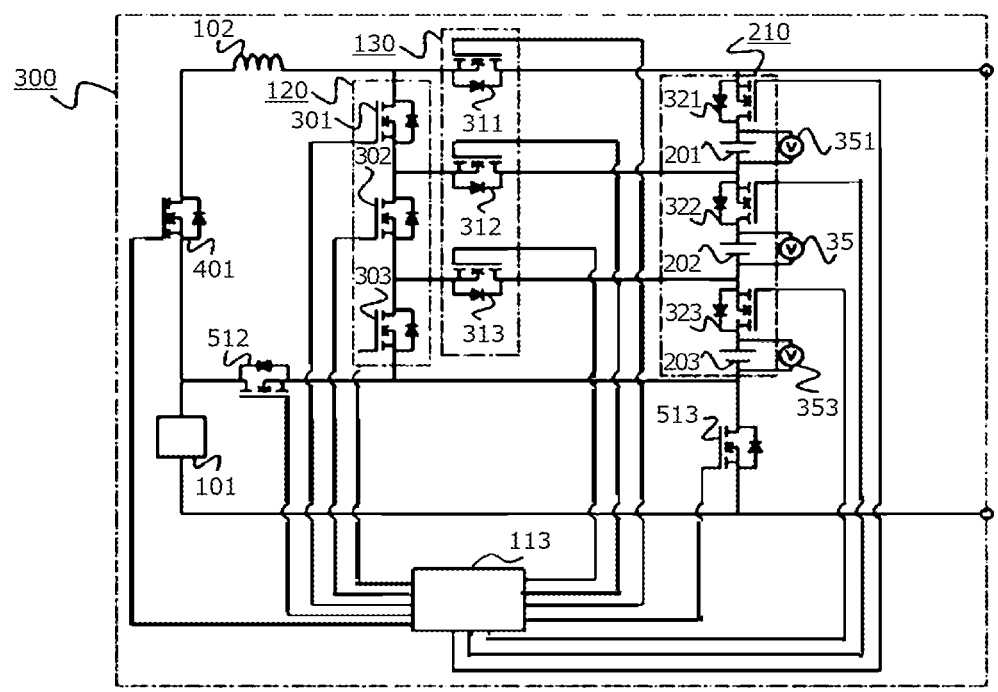
FIG. 25 is a diagram showing the configuration of a power supply device according to embodiment 5 of the present invention.
Figure 27:
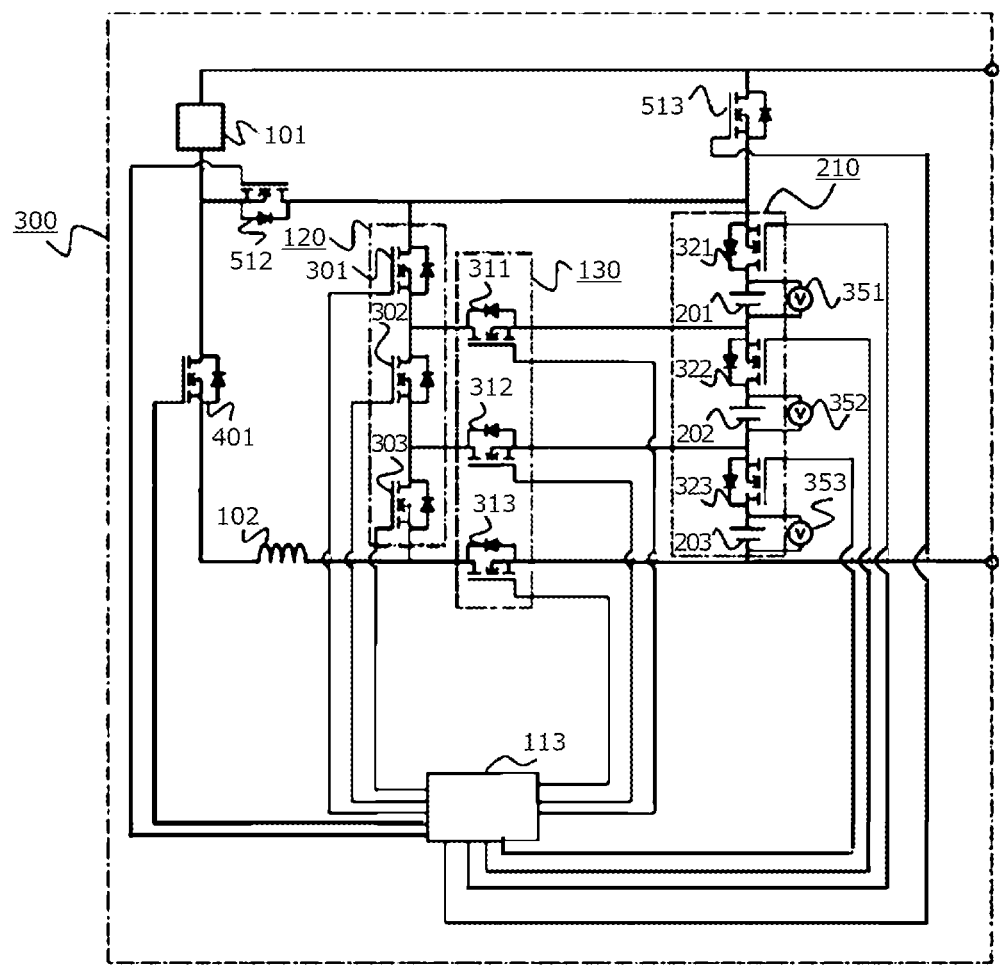
FIG. 27 is a diagram showing another configuration of the power supply device according to embodiment 5 of the present invention.

The above operation can be implemented also with a configuration shown in FIG. 27, instead of the configuration shown in FIG. 25. In the configuration shown in FIG. 27, the position of the second switch group 130 and the directions of the switches 311 to 313 composing the second switch group 130 are changed as compared to the configuration shown in FIG. 25 in embodiment 5.

That is, the source-side terminal of the switch 301 and the drain-side terminal of the switch 311 are connected to each other, the source-side terminal of the switch 311 is connected to the negative electrode of the unit 201, the drain-side terminal of the switch 321 is connected to the positive electrode of the unit 201, and the voltage measurement device 351 is connected in parallel to the unit 201. This forms a configuration stage for one unit.

That is, the configuration stage including the unit 201, the switches 301, 311, 321, and the voltage measurement device 351 is defined as a first stage. A second configuration stage includes the unit 202, the switches 302, 312, 322, and the voltage measurement device 352, and a third configuration stage includes the unit 203, the switches 303, 313, 323, and the voltage measurement device 353. The connection relationships in the second stage and the third stage are the same as that in the first stage, and the description thereof is omitted.

The switch 512 has a source-side terminal connected to a connection point between the power storage mechanism 101 and the switch 401, and a drain-side terminal connected to the drain-side terminal of the switch 301 and the source-side terminal of the switch 321 connected to the positive electrode of the unit 201. The switch 513 has a drain-side terminal connected to the positive side of the power storage mechanism 101, and a source-side terminal connected to the source-side terminal of the switch 321 and the drain-side terminal of the switch 512.

A unit including the power storage mechanism 101, the reactor 102, and the switch 401 which are connected in series is connected to the negative electrode of the unit 203 and the drain-side terminal of the switch 513.

The negative-side terminal of the module 210 including the units 201, 202, 203 and the switches 321, 322, 323, and the positive-side terminal of the power storage mechanism 101, are connected to the electric device 180 shown in FIG. 1.

In the configuration shown in FIG. 27, in the case of charging or discharging the unit(s), the unit 201 is always included as a unit to be charged or discharged. The details of the operation will not be described in order to avoid repetition of the same description.

Further, if a state-of-charge measurement device for measuring the state of charge of each unit is provided instead of the voltage measurement device, an effect of suppressing variation among the states of charge is obtained also for a unit in which the amount of change in the voltage due to change in the state of charge is small. In the case of providing the state-of-charge measurement devices, equalization of the states of charge can be implemented by replacing "voltage" written in steps S2 to S5 in FIG. 26 with "state of charge".

Through the operations described above, when there is variation among the voltages or the states of charge of the units included in the module, the power supply device 300 according to embodiment 5 can reduce the variation, and power can be actively passed and received between the power storage mechanism and one or more units. In addition, when there is a defective unit the usage of which has become difficult for such a reason that the power storage device in this unit has been significantly deteriorated, the defective unit can be electrically separated, and for compensating the voltage corresponding to the separated unit, the power storage mechanism can be electrically connected in series to the module.

Embodiment 6

Next, a power supply device according to embodiment 6 of the present invention will be described with reference to FIG. 28 to FIG. 30.

Figure 28:
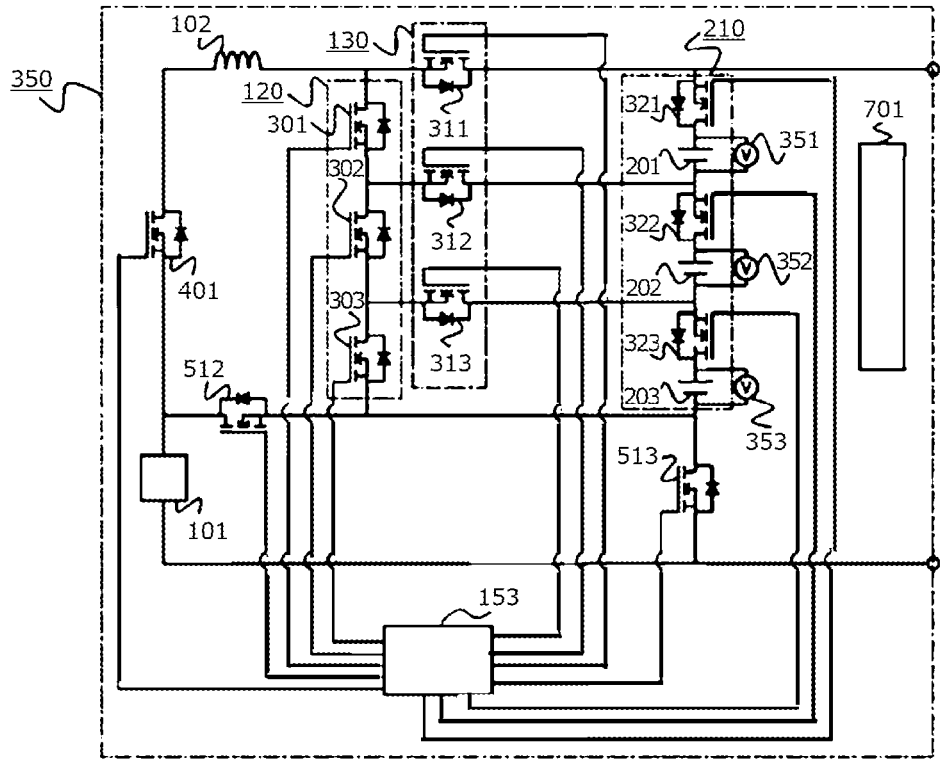
FIG. 28 is a diagram showing the configuration of a power supply device according to embodiment 6 of the present invention.

FIG. 28 shows the configuration of the power supply device according to embodiment 6 of the present invention. The power supply device 350 includes a power storage mechanism 101, a reactor 102, switches 401, 512, 513, a module 210, a first switch group 120 including a plurality of switches 301 to 303, a second switch group 130 including a plurality of switches 311 to 313, voltage measurement devices 351, 352, 353, a temperature measurement device 701, and a control operation section 153. The module 210 includes units 201, 202, 203 and switches 321, 322, 323.

In the power supply device 350 shown in FIG. 28, the configuration except for the temperature measurement device 701 is the same as that shown in FIG. 25 in embodiment 5. Therefore, the same or corresponding parts are denoted by the same reference characters and the description thereof is omitted. The control operation section 153 receives information about the voltages of the units 201 to 203 detected by the voltage measurement devices 351, 352, 353 and the temperature of the module 210 measured by the temperature measurement device 701, and outputs signals to the gate-side terminals of the switches 301 to 303, 311 to 313, 321 to 323, 401, 512, 513 to switch each switch between a conductive state and a non-conductive state.

It is noted that the number of the units may be other than three, and also, the number of the configuration stages may be other than three. The switches connected in series to the units may be connected in a reversed order. Preferably, the power storage mechanism 101 is a secondary cell, an assembled battery, a capacitor, or an electric double layer capacitor. More preferably, the power storage mechanism 101 is a unit having property equal to those of the units 201, 202, 203.

In the case where the unit 201 is determined to be defective, the switches 321, 401 connected in series to the unit 201 are brought into a non-conductive state, and the switches 301, 311, 312 are brought into a conductive state. Further, the switches 401, 513 are switched to a non-conductive state, and the switch 512 is switched to a conductive state. Thus, current flowing between the electric device 180 and the module 210 passes through the switches 301, 311, 312, 512, the units 202, 203, and the power storage mechanism 101 without passing through the unit 201. Similarly, in the case where a unit other than the unit 201 is determined to be defective, the switch connected in series to the defective unit and the switches 401, 513 are brought into a non-conductive state, and the switch connected in parallel to the defective unit and the switch 512 are brought into a conductive state so that the current bypasses the defective unit.

In the case where there are no units that are determined to be defective, the switch 512 is brought into a non-conductive state, and the switches 321, 322, 323, 401, 513 are brought into a conductive state. The voltage measurement devices 351, 352, 353 measure the voltages of the units 201, 202, 203, and send the measurement information to the control operation section 153. When the voltage of any of the units is smaller or greater to some degree than the average of the voltages of the units, the control operation section 153 controls the switches so as to reduce the voltage difference. If there is a unit having a voltage difference greater than a reference value, the voltage difference of this unit is reduced. When variations in the voltages of the units have become lower than a certain level, the control operation section 153 determines that the voltages of the units are equalized, and brings all the switches into a non-conductive state. In the configuration shown in FIG. 28, in the case of charging or discharging the unit(s), the unit 203 is always included as a unit to be charged or discharged. The details of the operation and the procedure will not be described in order to avoid repetition of the same description.

The temperature measurement device 701 measures the temperature of the module and sends the measurement information to the control operation section 153. When the measured temperature is smaller than a predetermined reference value, discharging from the units 201, 202, 203 to the power storage mechanism 101 and charging from the power storage mechanism 101 to the units 201, 202, 203 are repetitively performed. Thus, heat is generated due to the internal resistances of the units 201, 202, 203, whereby the temperatures of the units 201, 202, 203 can be increased. When the measured temperature is greater than the predetermined reference value, the temperature increasing function is stopped. Thereafter, operation for reducing variations in the voltages of the units as described in embodiment 3 is performed as necessary. The details of this operation will not be described in order to avoid repetition of the same description.

Figure 29:
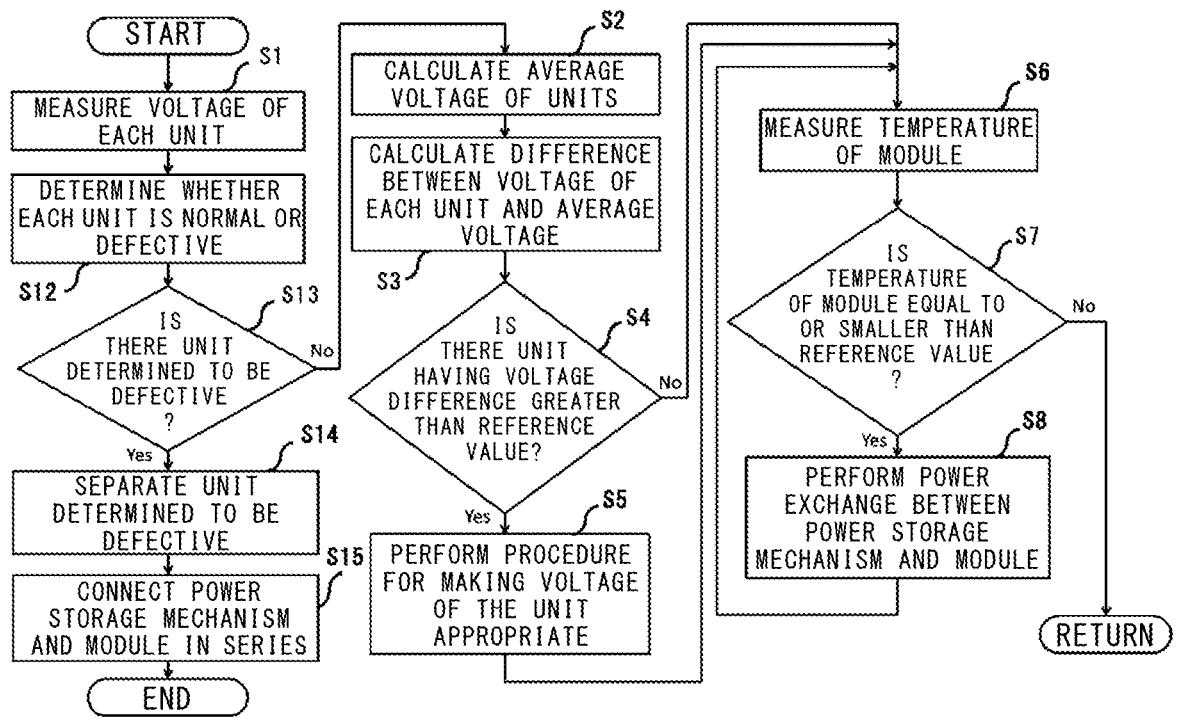
FIG. 29 shows a flowchart of operation of the power supply device according to embodiment 6 of the present invention.

FIG. 29 shows an example of a flowchart of operation of the power supply device according to embodiment 6. In FIG. 29, step S1, steps S12 to S15 subsequent to step S1, and steps S2 to S5 subsequent to step S13 are the same as those in the flowchart described in FIG. 26, and therefore the description thereof is omitted. In addition, steps S6 to S8 subsequent to step S5 are the same as those in the flowchart described in FIG. 16, and therefore the description thereof is omitted.

It is noted that the process does not necessarily have to follow this flowchart and the order of the steps may be changed.

Figure 30:
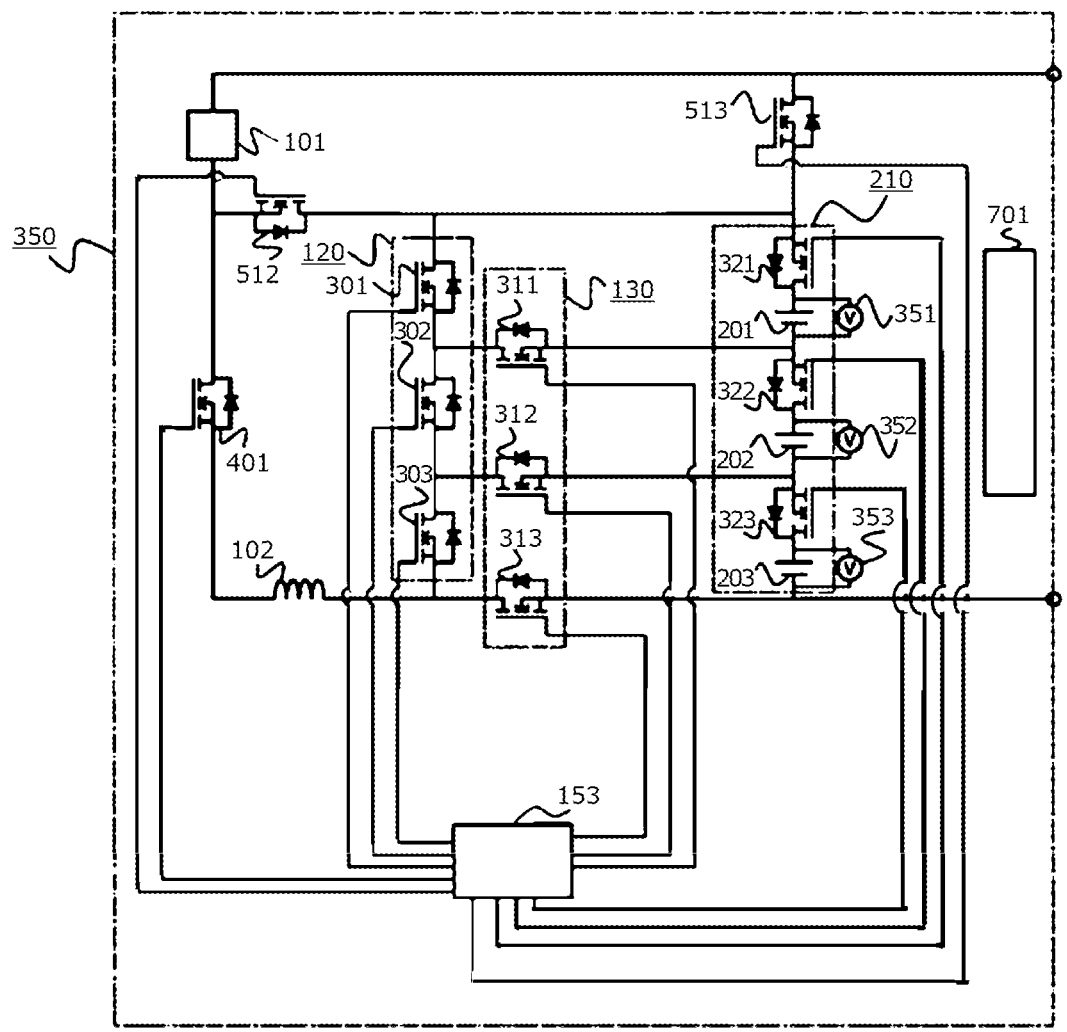
FIG. 30 is a diagram showing another configuration of the power supply device according to embodiment 6 of the present invention.

The above operation can be implemented also with a configuration shown in FIG. 30, instead of the configuration shown in FIG. 28. In the configuration shown in FIG. 30, the position of the second switch group 130 and the directions of the switches 311 to 313 composing the second switch group 130 are changed as compared to the configuration shown in FIG. 28 in embodiment 6.

In the configuration shown in FIG. 30, in the case of charging or discharging the unit(s), the unit 201 is always included as a unit to be charged or discharged. The details of the operation will not be described in order to avoid repetition of the same description.

Further, if a state-of-charge measurement device for measuring the state of charge of each unit is provided instead of the voltage measurement device, an effect of suppressing variation among the states of charge is obtained also for a unit in which the amount of change in the voltage due to change in the state of charge is small. In the case of providing the state-of-charge measurement devices, equalization of the states of charge can be implemented by replacing "voltage" written in steps S2 to S5 in FIG. 29 with "state of charge".

Through the operations described above, when there is variation among the voltages or the states of charge of the units included in the module, the power supply device 350 according to embodiment 6 can reduce the variation.

In addition, when the temperature of the module is smaller than the reference value, the temperature of the module can be increased. Further, when there is a defective unit, the defective unit can be electrically separated.

Embodiment 7

Next, a power supply device according to embodiment 7 of the present invention will be described with reference to FIG. 31 to FIG. 35.

Figure 31:
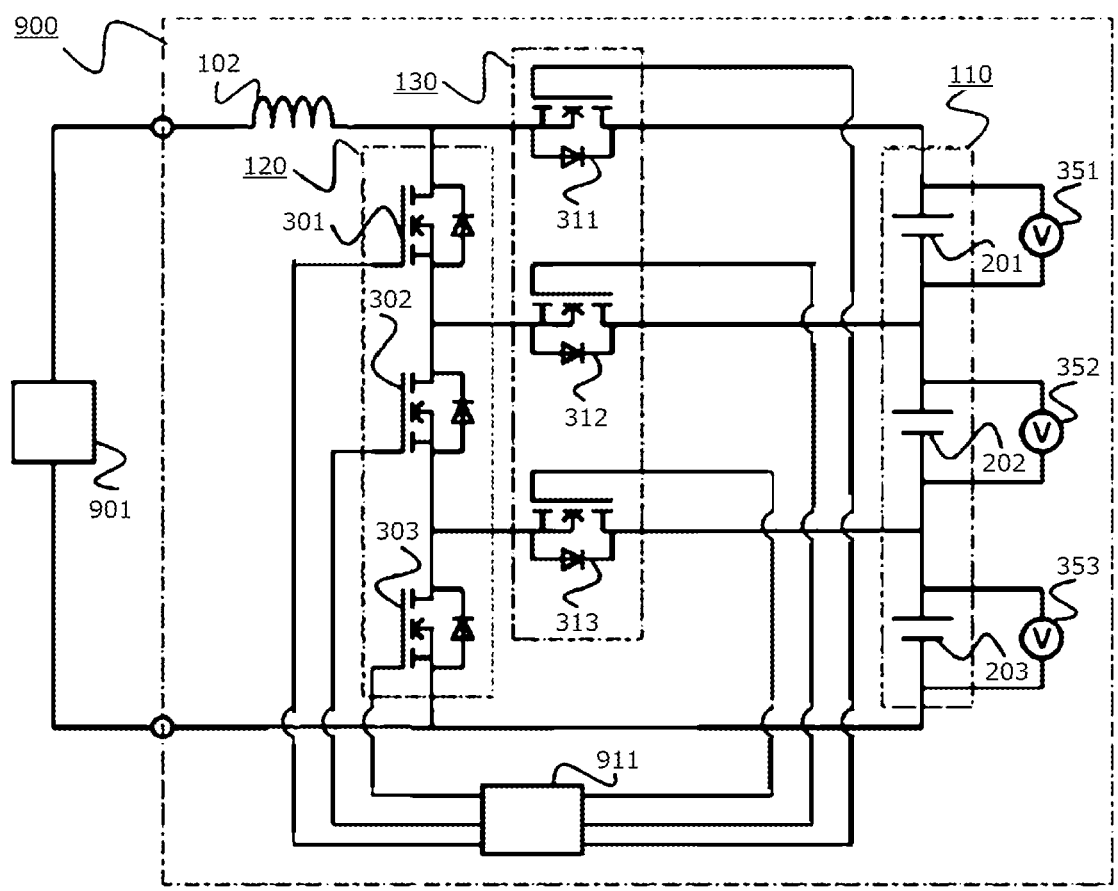
FIG. 31 is a diagram showing the configuration of a power supply device according to embodiment 7 of the present invention.

FIG. 31 shows the configuration of the power supply device according to embodiment 7 of the present invention. A power supply device 900 includes a reactor 102, a module 110, a first switch group 120 including a plurality of switches 301 to 303, a second switch group 130 including a plurality of switches 311 to 313, voltage measurement devices 351, 352, 353 and a control operation section 911. The module 110 includes units 201, 202, 203. The power supply device 900 is connected to an electric device 901.

It is noted that each unit 201, 202, 203 may be a single power storage device or may be formed by a combination of a plurality of power storage devices. In addition, the power storage device may be a secondary cell or may be a device having a power storage function, such as a capacitor or an electric double layer capacitor. The switches 301 to 303, 311 to 313 may have body diodes therein, or may be formed by combining a diode with a switching element not having a body diode. Preferably, the switches 301, 302, 303, 311, 312, 313 are MOSFETs.

In the power supply device 900 shown in FIG. 31, the configuration except for connecting the electric device 901 instead of the power storage mechanism 101 is the same as that shown in FIG. 2 in embodiment 1. Therefore, the same or corresponding parts are denoted by the same reference characters and the description thereof is omitted. The control operation section 911 receives information about the voltages of the units 201 to 203 detected by the voltage measurement devices 351, 352, 353, and outputs signals to the gate-side terminals of the switches 301 to 303, 311 to 313, to switch each switch between a conductive state and a non-conductive state.

It is noted that the number of the units 201 to 203 may be other than three, and also, the number of the configuration stages may be other than three. In addition, the number of power supply devices 900 connected to the electric device 901 may be other than one, and a plurality of electric devices 901 may be connected in parallel.

Operation in the case of supplying power from the unit 203 to the electric device 901 will be described. In the case of supplying power from the unit 203 to the electric device 901, the switches 301, 311, 302, 312, 303 are all brought into a non-conductive state. Thus, the units 201, 202 are electrically isolated from the power storage mechanism 101, and do not pass or receive power to or from the electric device 901. Meanwhile, the switch 313 is switched between a conductive state and a non-conductive state. When the switch 313 is in a conductive state, power is transferred from the unit 203 through the reactor 102 to the electric device 901, whereby the unit 203 is discharged. When the switch 313 is in a non-conductive state, the unit 203 is electrically isolated, so that the unit 203 does not transfer power to the electric device 901. Through repetitive switching of the switch 313 between a conductive state and a non-conductive state, power is supplied from the unit 203 to the electric device 901.

Operation in the case of supplying power from the units 202, 203 to the electric device 901 will be described.

In the case of supplying power from the units 202, 203 to the electric device 901, the switches 301, 311, 302, 303, 313 are all brought into a non-conductive state. Thus, the unit 201 is electrically isolated from the power storage mechanism 101, and does not pass or receive power to or from the electric device 901. Meanwhile, the switch 312 is switched between a conductive state and a non-conductive state. When the switch 312 is in a conductive state, power is transferred from the units 202, 203 through the reactor 102 to the electric device 901, whereby the units 202, 203 are discharged. When the switch 312 is in a non-conductive state, units 202, 203 do not transfer power to the electric device 901. Through repetitive switching of the switch 312 between a conductive state and a non-conductive state, the units 202, 203 are gradually discharged, so that the voltages of the units 202, 203 are reduced.

Operation in the case of supplying power from the units 201, 202, 203 to the electric device 901 will be described. In the case of supplying power from the units 201, 202, 203 to the electric device 901, the switches 301, 302, 312, 303, 313 are all brought into a non-conductive state. Meanwhile, the switch 311 is switched between a conductive state and a non-conductive state. When the switch 311 is in a conductive state, power is transferred from the units 201, 202, 203 through the reactor 102 to the electric device 901, whereby the units 201, 202, 203 are discharged. When the switch 311 is in a non-conductive state, the units 201, 202, 203 do not transfer power to the electric device 901. Through repetitive switching of the switch 311 between a conductive state and a non-conductive state, the units 201, 202, 203 are gradually discharged, so that the voltages of the units 202, 203 are reduced.

Operation in the case of charging from the electric device 901 to the unit 203 by regeneration will be described. In the case of regenerating from the electric device 901 to the unit 203, the switches 301, 302 are brought into a conductive state, and the switches 311, 312, 313 are brought into a non-conductive state. Thus, the units 201, 202 are electrically isolated from the electric device 901, and do not pass or receive power to or from the electric device 901. Meanwhile, the switch 303 is switched between a conductive state and a non-conductive state. When the switch 303 is in a conductive state, current flows from the electric device 901 through the reactor 102, and the longer the conduction period of the switch 303 is, the more the current is amplified. When the switch 303 is in a non-conductive state, the amplified current passes through the diode part of the switch 313, to flow to the unit 203. Through repetitive switching of the switch 303 between a conductive state and a non-conductive state, the unit 203 is charged, whereby the voltage of the unit 203 is increased.

Operation in the case of charging from the electric device 901 to the units 202, 203 by regeneration will be described. In the case of charging from the electric device 901 to the units 202, 203 by regeneration, the switches 301, 303 are brought into a conductive state, and the switches 311, 312, 313 are brought into a non-conductive state. Thus, the unit 201 is electrically isolated from the electric device 901, and does not pass or receive to or from the electric device 901. Meanwhile, the switch 302 is switched between a conductive state and a non-conductive state. When the switch 302 is in a conductive state, current flows from the electric device 901 through the reactor 102, and the longer the conduction period of the switch 302 is, the more the current is amplified. When the switch 302 is in a non-conductive state, the amplified current passes through the diode part of the switch 312, to flow to the units 202, 203. Through repetitive switching of the switch 302 between a conductive state and a non-conductive state, the units 202, 203 are charged, so that the voltages of the units 202, 203 are increased.

Operation in the case of charging from the electric device 901 to the units 201, 202, 203 by regeneration will be described. In the case of charging from the electric device 901 to the units 201, 202, 203 by regeneration, the switches 302, 303 are brought into a conductive state, and the switches 311, 312, 313 are brought into a non-conductive state. Meanwhile, the switch 301 is switched between a conductive state and a non-conductive state. When the switch 301 is in a conductive state, current flows from the electric device 901 through the reactor 102, and the longer the conduction period of the switch 301 is, the more the current is amplified. When the switch 301 is in a non-conductive state, the amplified current passes through the diode part of the switch 311, to flow to the unit 201, 202, 203. Through repetitive switching of the switch 301 between a conductive state and a non-conductive state, the units 201, 202, 203 are charged, so that the voltages of the units 201, 202, 203 are increased. In the configuration shown in FIG. 31, in the case of charging or discharging the unit(s), the unit 203 is always included as a unit to be charged or discharged. The above operations are the same as those shown in FIG. 13.

The voltage measurement devices 351, 352, 353 measure the voltages of the units 201, 202, 203 and send the measurement information to the control operation section 911. When the voltage of any of the units is smaller or greater to some degree than the average of the voltages of the units, the control operation section 911 controls the switches 301 to 303, 311 to 313 so as to reduce the voltage difference.

If there is a unit having a voltage difference greater than a reference value, the control operation section 911 performs control so that the voltage difference of the unit does not become great, when performing supply of power to the electric device 901 or when performing charging from the electric device 901 by regeneration. When the difference between the voltage of each unit and the average of the voltages of the units has become equal to or smaller than a reference value, the control operation section 911 determines that the voltages of the units are equalized, and performs control so that power is passed and received between the electric device 901 and all the units 201, 202, 203.

FIG. 32 is a table showing operations performed when the voltage of each of the units 201 to 203 is greater as compared to the average voltage and when the voltage is smaller as compared to the average voltage, in each of the case where the electric device 901 performs power-running and the case where the electric device 901 performs regeneration.

Figure 33:
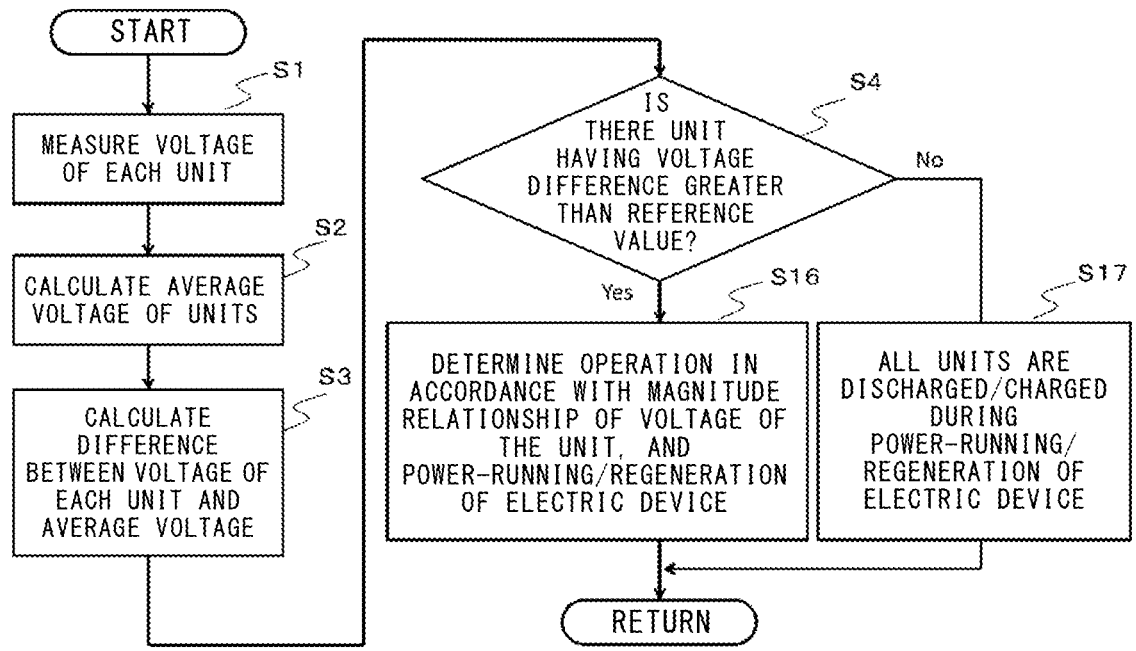
FIG. 33 shows a flowchart of operation of the power supply device according to embodiment 7 of the present invention.

FIG. 33 shows an example of a flowchart of operation of the power supply device 900 according to embodiment 7. In FIG. 33, steps S1 to S4 are the same as those in the flowchart described in FIG. 11, and therefore the description thereof is omitted. If there is a unit having a voltage difference greater than the reference value in step S4 (YES), the process proceeds to step S16, to perform operation in accordance with FIG. 32, depending on the magnitude relationship of the voltage of the corresponding unit and whether operation of the electric device 901 is power-running or regeneration.

On the other hand, if there are no units having voltage differences greater than the reference value in step S4 (NO), the process proceeds to step S17, in which all the units are discharged or charged when the electric device 901 performs power-running or regeneration.

It is noted that the process does not necessarily have to follow this flowchart and the order of the steps may be changed.

Figure 34:
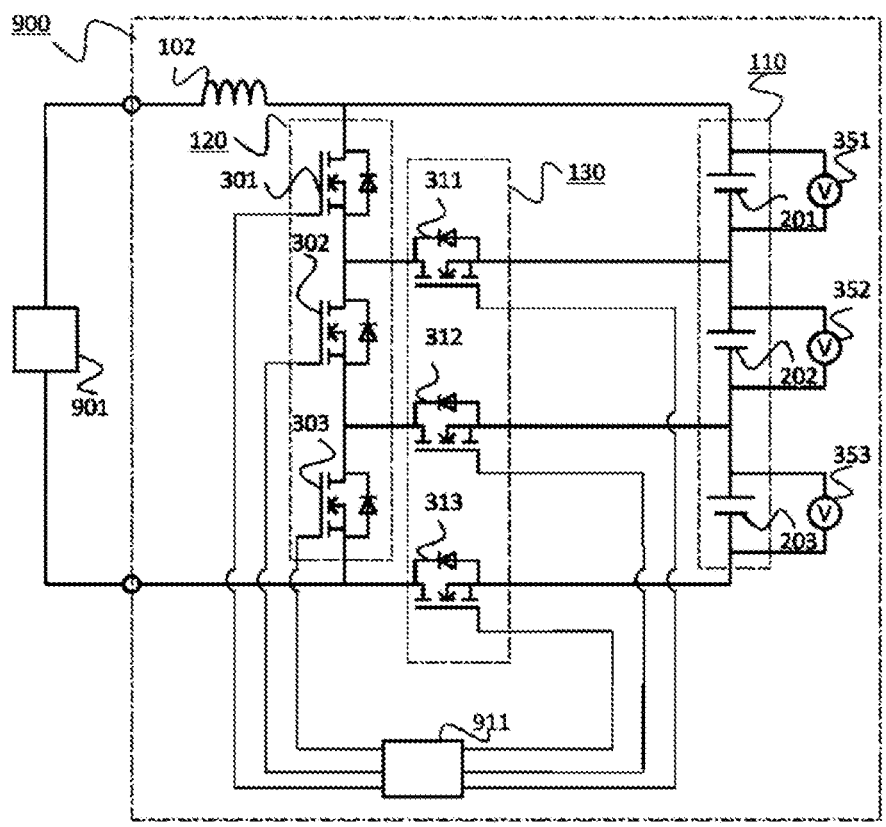
FIG. 34 is a diagram showing another configuration of the power supply device according to embodiment 7 of the present invention.

The above operation can be implemented also with a configuration shown in FIG. 34, instead of the configuration shown in FIG. 32. In the configuration shown in FIG. 34, the position of the second switch group 130 and the directions of the switches 311 to 313 composing the second switch group 130 are changed as compared to the configuration shown in FIG. 32 in embodiment 7.

That is, the source-side terminal of the switch 301 and the drain-side terminal of the switch 311 are connected to each other, the source-side terminal of the switch 311 is connected to the negative electrode of the unit 201, and the voltage measurement device 351 is connected in parallel to the unit 201. This forms a configuration stage for one unit.

That is, the configuration stage including the unit 201, the switches 301, 311, and the voltage measurement device 351 is defined as a first stage. A second configuration stage includes the unit 202, the switches 302, 312, and the voltage measurement device 352, and a third configuration stage includes the unit 203, the switches 303, 313, and the voltage measurement device 353. The connection relationships in the second stage and the third stage are the same as that in the first stage, and the description thereof is omitted.

In the configuration shown in FIG. 34, in the case of charging or discharging the unit(s), the unit 201 is always included as a unit to be charged or discharged. The operations are the same as those shown in FIG. 13, and therefore the description thereof is omitted. FIG. 35 shows operation patterns.

FIG. 35 is a table showing operations performed when the voltage of each of the units 201 to 203 is greater as compared to the average voltage and when the voltage is smaller as compared to the average voltage, in each of the case where the electric device 901 performs power-running and the case where the electric device 901 performs regeneration, as in FIG. 32. In addition, an example of a flowchart in this case is as shown in FIG. 33.

Through the operations described above, the power supply device 900 according to embodiment 7 can perform control so that variations in the voltages of the units 201 to 203 included in the module 110 do not become great, when power is passed and received between the electric device 901 and the module 110.

Further, if a state-of-charge measurement device for measuring the state of charge of each unit is provided instead of the voltage measurement device, it is possible to, also for a unit in which the amount of change in the voltage due to change in the state of charge is small, perform control so that variation in the state of charge does not become great. In the case of providing the state-of-charge measurement device, the operation for preventing increase in variation among the states of charge can be implemented by replacing "voltage" written in FIG. 32 and FIG. 33 with "state of charge".

Embodiment 8

Next, a power supply device according to embodiment 8 of the present invention will be described.

Figure 36:
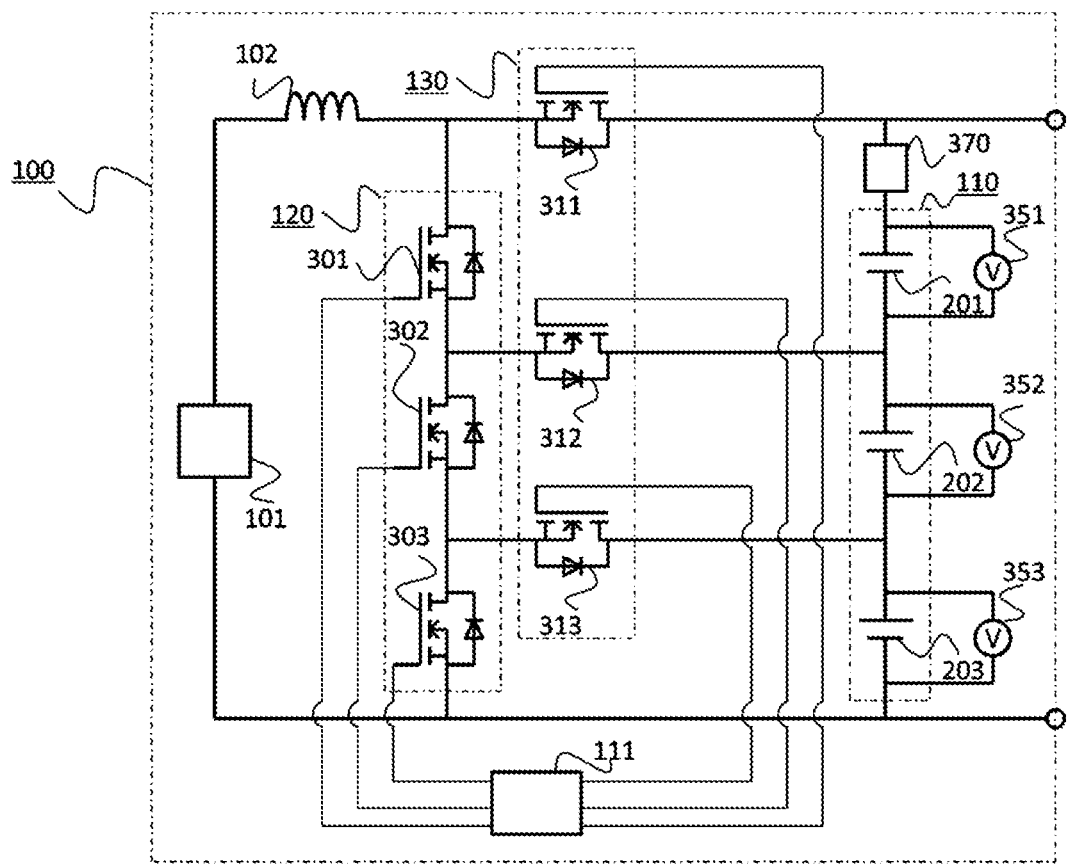
FIG. 36 is a diagram showing the configuration of a power supply device according to embodiment 8 of the present invention.

FIG. 36 shows a configuration in which a current measurement device 370 for measuring current flowing through the module is added to, as an example, the configuration shown in FIG. 2 which is one of the configuration examples in embodiment 1. The control operation section 111 performs calculation to determine whether or not a current value detected by the current measurement device 370 is within a predetermined tolerable range of charge/discharge current value. If the current value detected by the current measurement device 370 is outside the tolerable range of charge/discharge current value, the control operation section 111 performs control so that the power storage mechanism 101 undergoes charging/discharging for a part or an entirety of charge/discharge current. It is possible to cause the power storage mechanism 101 to bear a part or an entirety of charge/discharge current by performing an operation of charging all the units or discharging all the units, of the operations shown in FIG. 13, for example. This can reduce load of charge/discharge current on each unit included in the module 110. The configuration in which the current measurement device is added can be applied to all the configurations described in embodiments 1 to 6. It is noted that the current measurement device 370 is only required to be capable of measuring current flowing through the module 110, and therefore the location thereof and the measurement method are not limited.

In the configurations described in embodiment 2, embodiment 4, and embodiment 6, the control operation section may perform control so that the power storage mechanism 101 bears a part or an entirety of charge/discharge current, when the temperature of the module 110 measured by the temperature measurement device 701 is greater than the predetermined reference value. Thus, heat generation due to current flowing through the module 110 is suppressed and increase in the temperature of the module 110 can be prevented.

Through the above operations, the power storage mechanism 101 bears a part or an entirety of charging/discharging current in the power supply device 100, thereby reducing load on the module 110.

Figure 37:
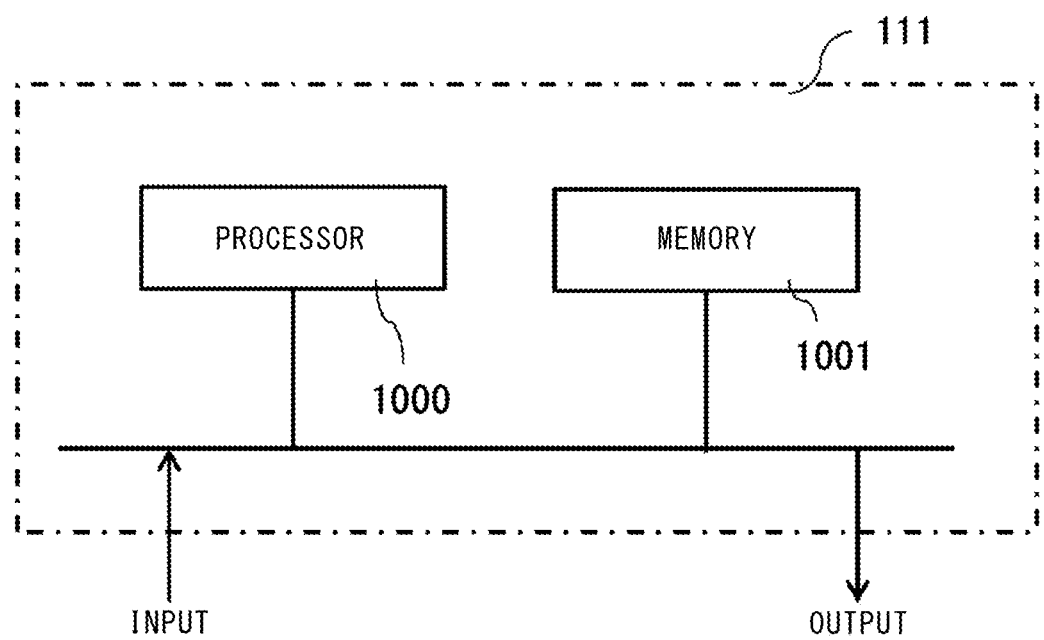
FIG. 37 is a diagram showing an example of hardware of a control operation section according to embodiment 1, etc., of the present invention.

It is noted that the control operation sections 111 to 113, 151 to 153, 911 are each composed of a processor 1000 and a memory 1001, as shown in FIG. 37 which shows an example of hardware thereof. Although not shown, the memory includes a volatile memory such as a random access memory, and a nonvolatile auxiliary memory such as a flash memory. Instead of a flash memory, an auxiliary memory as a hard disk may be provided. The processor 1000 executes a program inputted from the memory 1001. In this case, the program is inputted from the auxiliary memory through the volatile memory to the processor 1000. The processor 1000 may output data such as a computation result to the volatile memory of the memory 1001, or may store the data into the auxiliary memory via the volatile memory.

While embodiments of the present invention have been described above, the present invention is not limited to the embodiments, and various design modifications may be made therefor. Within the scope of the present invention, the embodiments may be freely combined with each other, or each embodiment may be modified or simplified as appropriate.

DESCRIPTION OF THE REFERENCE CHARACTERS 100 power supply device
101 power storage mechanism
102 reactor
110 module
111 to 113 control operation section
120 first switch group
130 second switch group
150 power supply device
151 to 153 control operation section
180 electric device
200 power supply device
201 to 203 unit
210 module
250 power supply device
300 power supply device
350 power supply device
900 power supply device
301 to 303 switch (step-up switch)
311 to 313 switch (step-down switch)
321 to 323 separation switch
351 to 353 voltage measurement device
370 current measurement device
401, 512, 513 switch
701 temperature measurement device
901 electric device
911 control operation section

The invention claimed is:
1. A power supply device comprising:
n configuration stages, n being an integer equal to or greater than 2, each configuration stage including: a unit including one or more power storage devices; a step-down switch having a drain-side terminal connected to a positive electrode of the unit; and a step-up switch having a drain-side terminal connected to a source-side terminal of the step-down switch;
a voltage measurement device to measure voltage of each unit;
a power storage mechanism to store electric energy and capable of receiving and outputting power;
a reactor connected in series to the power storage mechanism; and
a control operation section to switch each of the step-down switch and the step-up switch between a conductive state and a non-conductive state, wherein
the positive electrode of the unit in an m-th configuration stage of the configuration stages is connected to a negative electrode of the unit in an (m−1)-th configuration stage of the configuration stages, m being an integer satisfying 2≤m≤n,
the drain-side terminal of the step-up switch included in the m-th configuration stage is connected to a source-side terminal of the step-up switch included in the (m−1)-th configuration stage,
a source-side terminal of the step-up switch included in an n-th configuration stage of the configuration stages is connected to a negative electrode of the unit included in the n-th configuration stage,
the n step-up switches connected in series are connected in parallel to a series circuit including the power storage mechanism and the reactor, and
the control operation section refers to the voltage of each unit measured by the voltage measurement device, and when any of the units has such voltage that an absolute value of a difference from an average value of the voltages of the plurality of units is greater than a reference value, the control operation section performs control so as to reduce the difference.

2. The power supply device according to claim 1, wherein each configuration stage includes a separation switch connected in series to the unit, and a first switch is connected in series to the power storage mechanism such that a drain-side terminal has a higher potential than a source-side terminal,
the control operation section determines whether or not each unit operates normally, and
when any of the configuration stages includes a defective unit determined not to operate normally, the control operation section brings the first switch and the separation switch included in the configuration stage corresponding to the defective unit, into a non-conductive state, and brings the step-down switch and the step-up switch into a conductive state so that current bypasses the defective unit, so as to electrically separate the defective unit.

3. The power supply device according to claim 2, wherein where k is an integer satisfying 1≤k≤n, by repetitively switching the step-down switch included in a k-th configuration stage of the n configuration stages between a conductive state and a non-conductive state, and bringing all the other step-down switches and step-up switches into a non-conductive state, the unit included in one or a plurality of the configuration stages including the k-th configuration stage is discharged, voltage is stepped down, and power is transferred to the power storage mechanism, and
by repetitively switching the step-up switch included in a k-th configuration stage of the n configuration stages between a conductive state and a non-conductive state, bringing all the step-up switches included in the other configuration stages into a conductive state, and bringing all the step-down switches into a non-conductive state, voltage is stepped up from the power storage mechanism, and the unit included in one or a plurality of the configuration stages including the k-th configuration stage is charged.

4. The power supply device according to claim 1, wherein each configuration stage includes a separation switch connected in series to the unit,
a first switch is connected in series to the power storage mechanism such that a drain-side terminal has a higher potential than a source-side terminal,
one end of the reactor is connected to the drain-side terminal of the step-up switch included in a first configuration stage of the configuration stages, and another end of the reactor is connected to the drain-side terminal of the first switch,
a drain-side terminal of a second switch is connected between the source-side terminal of the first switch and a positive-side terminal of the power storage mechanism,
a source-side terminal of the second switch is connected to the source-side terminal of the step-up switch included in the n-th configuration stage, and is connected to a drain-side terminal of a third switch,
a source-side terminal of the third switch is connected to a negative-side terminal of the power storage mechanism,
the control operation section determines whether or not each unit operates normally, and
when any of the configuration stages includes a defective unit determined not to operate normally, the control operation section brings the separation switch included in the configuration stage corresponding to the defective unit, into a non-conductive state, brings the first switch into a non-conductive state, brings the second switch into a conductive state, brings the third switch into a non-conductive state, and brings the step-down switch and the step-up switch into a conductive state so that current bypasses the defective unit, so as to electrically separate the defective unit and electrically connect the power storage mechanism in series.

5. The power supply device according to claim 4, where k is an integer satisfying 1≤k≤n, by repetitively switching the step-down switch included in a k-th configuration stage of the n configuration stages between a conductive state and a non-conductive state, and bringing all the other step-down switches and step-up switches into a non-conductive state, the unit included in one or a plurality of the configuration stages including the k-th configuration stage is discharged, voltage is stepped down, and power is transferred to the power storage mechanism, and
by repetitively switching the step-up switch included in a k-th configuration stage of the n configuration stages between a conductive state and a non-conductive state, bringing all the step-up switches included in the other configuration stages into a conductive state, and bringing all the step-down switches into a non-conductive state, voltage is stepped up from the power storage mechanism, and the unit included in one or a plurality of the configuration stages including the k-th configuration stage is charged.

6. The power supply device according to claim 1, wherein where k is an integer satisfying 1≤k≤n, by repetitively switching the step-down switch included in a k-th configuration stage of the n configuration stages between a conductive state and a non-conductive state, and bringing all the other step-down switches and step-up switches into a non-conductive state, the unit included in one or a plurality of the configuration stages including the k-th configuration stage is discharged, voltage is stepped down, and power is transferred to the power storage mechanism, and by repetitively switching the step-up switch included in a k-th configuration stage of the n configuration stages between a conductive state and a non-conductive state, bringing all the step-up switches included in the other configuration stages into a conductive state, and bringing all the step-down switches into a non-conductive state, voltage is stepped up from the power storage mechanism, and the unit included in one or a plurality of the configuration stages including the k-th configuration stage is charged.

7. The power supply device according to claim 1, further comprising a state-of-charge measurement device to measure a state of charge of each unit, wherein the control operation section refers to the state of charge of each unit measured by the state-of-charge measurement device, and when any of the units has such a state of charge that an absolute value of a difference from an average value of the states of charge of the plurality of units is greater than a reference value, the control operation section performs control so as to reduce the difference.

8. The power supply device according to claim 1, further comprising a temperature measurement device to measure a temperature of the units, wherein the control operation section refers to the temperature of the units measured by the temperature measurement device, and when the measured temperature is smaller than a reference value, the control operation section performs control so that power is passed and received between the power storage mechanism and the units.

9. The power supply device according to claim 1, further comprising a current measurement device to measure a current value of current flowing through the units connected in series, wherein the control operation section refers to the current value measured by the current measurement device, and when the measured current value is outside a predetermined range, the control operation section performs control so that the power storage mechanism undergoes charging/discharging for a part or an entirety of charge/discharge current.

10. The power supply device according to claim 1, further comprising a temperature measurement device to measure a temperature of the units, wherein the control operation section refers to the temperature of the units measured by the temperature measurement device, and when the measured temperature is greater than a reference value, the control operation section performs control so that the power storage mechanism undergoes charging/discharging for a part or an entirety of charge/discharge current.

11. The power supply device according to claim 1, wherein the power storage mechanism is replaced with an electric device, the electric device has at least one of a power consuming function and a power generating function, and the n step-up switches connected in series are connected in parallel to a series circuit including the electric device and the reactor.

12. The power supply device according to claim 11, further comprising a voltage measurement device to measure voltage of each unit, wherein the control operation section refers to the voltage of each unit measured by the voltage measurement device, when the voltage of the unit in a k-th configuration stage of the configuration stages, k being an integer satisfying $1 \leq k \leq n$, is greater than an average value of the voltages of the plurality of units by a reference value or greater, while power is being consumed by the electric device, the control operation section performs control so as to discharge one or a plurality of the units including the unit in the k-th configuration stage, to supply power, and while power is being regenerated from the electric device, the control operation section performs control so as to charge, with power, one or a plurality of units not including the unit in the k-th configuration stage, and when the voltage of the unit in a k-th configuration stage of the configuration stages is smaller than an average value of the voltages of the plurality of units by a reference value or greater, while power is being consumed by the electric device, the control operation section performs control so as to discharge one or a plurality of the units not including the unit in the k-th configuration stage, to supply power, and while power is regenerated from the electric device, the control operation section performs control so as to charge, with power, one or a plurality of the units not including the unit in the k-th configuration stage.

13. The power supply device according to claim 11, further comprising a state-of-charge measurement device to measure a state of charge of each unit, wherein the control operation section refers to the state of charge of each unit measured by the state-of-charge measurement device, when the state of charge of the unit in a k-th configuration stage of the configuration stages, k being an integer satisfying $1 \leq k \leq n$, is greater than an average value of the states of charge of the plurality of units by a reference value or greater, while power is being consumed by the electric device, the control operation section performs control so as to discharge one or a plurality of the units including the unit in the k-th configuration stage, to supply power, and while power is being regenerated from the electric device, the control operation section performs control so as to charge, with power, one or a plurality of units not including the unit in the k-th configuration stage, and when the state-of-charge of the unit in a k-th configuration stage of the configuration stages is smaller than an average value of the states of charge of the plurality of units by a reference value or greater, while power is being consumed by the electric device, the control operation section performs control so as to discharge one or a plurality of the units not including the unit in the k-th configuration stage, to supply power, and while power is regenerated from the electric device, the control operation section performs control so as to charge, with power, one or a plurality of the units not including the unit in the k-th configuration stage.

14. A power supply device comprising:
n configuration stages, n being an integer equal to or greater than 2, each configuration stage including: a unit including one or more power storage devices; a step-down switch having a source-side terminal connected to a negative electrode of the unit; and
a step-up switch having a source-side terminal connected to a drain-side terminal of the step-down switch;
a voltage measurement device to measure voltage of each unit;
a power storage mechanism to store electric energy and capable of receiving and outputting power;
a reactor connected in series to the power storage mechanism; and
a control operation section to switch each of the step-down switch and the step-up switch between a conductive state and a non-conductive state, wherein
a positive electrode of the unit in an m-th configuration stage of the configuration stages is connected to the negative electrode of the unit in an (m−1)-th configuration stage of the configuration stages, m being an integer satisfying 2≤m≤n,
a drain-side terminal of the step-up switch included in the m-th configuration stage is connected to the source-side terminal of the step-up switch included in the (m−1)-th configuration stage,
a drain-side terminal of the step-up switch included in a first configuration stage of the configuration stages is connected to a positive electrode of the unit included in the first configuration stage,
the n step-up switches connected in series are connected in parallel to a series circuit including the power storage mechanism and the reactor, and
the control operation section refers to the voltage of each unit measured by the voltage measurement device, and when any of the units has such voltage that an absolute value of a difference from an average value of the voltages of the plurality of units is greater than a reference value, the control operation section performs control so as to reduce the difference.

15. The power supply device according to claim 14, wherein
each configuration stage includes a separation switch connected in series to the unit,
a first switch is connected in series to the power storage mechanism such that a drain-side terminal has a higher potential than a source-side terminal,
one end of the reactor is connected to the source-side terminal of the step-up switch included in an n-th configuration stage of the configuration stages, and another end of the reactor is connected to the source-side terminal of the first switch,
a source-side terminal of a second switch is connected between the drain-side terminal of the first switch and a negative-side terminal of the power storage mechanism,
a drain-side terminal of the second switch is connected to the drain-side terminal of the step-up switch included in the first configuration stage, and is connected to a source-side terminal of a third switch,
a drain-side terminal of the third switch is connected to a positive-side terminal of the power storage mechanism,
the control operation section determines whether or not each unit operates normally, and
when any of the configuration stages includes a defective unit determined not to operate normally, the control operation section brings the separation switch included in the configuration stage corresponding to the defective unit, into a non-conductive state, brings the first switch into a non-conductive state, brings the second switch into a conductive state, brings the third switch into a non-conductive state, and brings the step-down switch and the step-up switch into a conductive state so that current bypasses the defective unit, so as to electrically separate the defective unit and electrically connect the power storage mechanism in series.

16. The power supply device according to claim 15, wherein
where k is an integer satisfying 1≤k≤n, by repetitively switching the step-down switch included in a k-th configuration stage of the n configuration stages between a conductive state and a non-conductive state, and bringing all the other step-down switches and step-up switches into a non-conductive state, the unit included in one or a plurality of the configuration stages including the k-th configuration stage is discharged, voltage is stepped down, and power is transferred to the power storage mechanism, and
by repetitively switching the step-up switch included in a k-th configuration stage of the n configuration stages between a conductive state and a non-conductive state, bringing all the step-up switches included in the other configuration stages into a conductive state, and bringing all the step-down switches into a non-conductive state, voltage is stepped up from the power storage mechanism, and the unit included in one or a plurality of the configuration stages including the k-th configuration stage is charged.

17. The power supply device according to claim 14, wherein
each configuration stage includes a separation switch connected in series to the unit, and a first switch is connected in series to the power storage mechanism such that a drain-side terminal has a higher potential than a source-side terminal,
the control operation section determines whether or not each unit operates normally, and
when any of the configuration stages includes a defective unit determined not to operate normally, the control operation section brings the first switch and the separation switch included in the configuration stage corresponding to the defective unit, into a non- conductive state, and brings the step-down switch and the step-up switch into a conductive state so that current bypasses the defective unit, so as to electrically separate the defective unit.

18. The power supply device according to claim 14, wherein
where k is an integer satisfying 1≤k≤n, by repetitively switching the step-down switch included in a k-th configuration stage of the n configuration stages between a conductive state and a non-conductive state, and bringing all the other step-down switches and step-up switches into a non-conductive state, the unit included in one or a plurality of the configuration stages including the k-th configuration stage is discharged, voltage is stepped down, and power is transferred to the power storage mechanism, and by repetitively switching the step-up switch included in a k-th configuration stage of the n configuration stages between a conductive state and a non-conductive state, bringing all the step-up switches included in the other configuration stages into a conductive state, and bringing all the step-down switches into a non-conductive state, voltage is stepped up from the power storage mechanism, and the unit included in one or a plurality of the configuration stages including the k-th configuration stage is charged.

* * * * *